US012764017B2

(12) United States Patent
Oktay et al.

(10) Patent No.: US 12,764,017 B2
(45) Date of Patent: Oct. 13, 2026

(54) SERVICE MANAGEMENT AND ORCHESTRATION FOR PRIVATE AND PUBLIC MOBILE NETWORKS

(71) Applicant: Juniper Networks, Inc., Sunnyvale, CA (US)

(72) Inventors: Oguz Oktay, Sunnyvale, CA (US); Edward Wai Hong Choh, Richmond (CA); Arda Akman, San Ramon, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 288 days.

(21) Appl. No.: 18/620,733

(22) Filed: Mar. 28, 2024

(65) Prior Publication Data

US 2025/0310184 A1 Oct. 2, 2025

(51) Int. Cl.
*H04L 41/342* (2022.01)
*H04L 41/0803* (2022.01)
(Continued)

(52) U.S. Cl.
CPC ...... *H04L 41/0806* (2013.01); *H04L 41/0895* (2022.05); *H04L 41/5009* (2013.01); (Continued)

(58) Field of Classification Search
CPC ............. H04L 41/0806; H04L 41/0803; H04L 41/0893; H04L 41/0894; H04L 41/0895; H04L 41/342; H04L 41/0596; H04L 41/5051; H04L 41/016; H04L 41/044; H04L 41/0548; H04W 24/02; H04W 28/04; H04W 84/10
(Continued)

(56) References Cited

U.S. PATENT DOCUMENTS 10,334,446 B2 * 6/2019 Ashrafi .................. H04B 7/024
10,425,491 B2 * 9/2019 Bugenhagen ......... H04L 41/083
(Continued)

FOREIGN PATENT DOCUMENTS

WO 2022013602 A1 1/2022

OTHER PUBLICATIONS

Mohammed et al. "Towards a unified network slicing model." 2019 15th international conference on network and service management (CNSM). IEEE, 2019. (Year: 2019).*
(Continued)

*Primary Examiner* — Christopher M Crutchfield
*Assistant Examiner* — Syed M Ahmed
(74) *Attorney, Agent, or Firm* — Shumaker & Sieffert P. A.

(57) ABSTRACT

A Private Mobile Network (PMN) orchestrator sends, to a controller for a public mobile network, a message indicating one or more network functions for a private mobile network slice for a private mobile network and configuration information for the private mobile network slice. In some examples, the message is a Global System for Mobile communications Association (GSMA) NEtwork Slice Type (NEST) extended to specify the one or more network functions for the private mobile network slice and the configuration information for the private mobile network slice. The message enables the public mobile network to deploy a public mobile network slice that extends the private mobile network slice.

18 Claims, 10 Drawing Sheets

(51) Int. Cl.

| | |
|---|---|
| ***H04L 41/0806*** | (2022.01) |
| ***H04L 41/0895*** | (2022.01) |
| ***H04L 41/40*** | (2022.01) |
| ***H04L 41/5009*** | (2022.01) |
| ***H04L 41/5051*** | (2022.01) |
| ***H04W 24/02*** | (2009.01) |
| ***H04W 28/24*** | (2009.01) |
| *H04W 84/10* | (2009.01) |

(52) U.S. Cl.
CPC ........... *H04W 24/02* (2013.01); *H04W 28/24* (2013.01); *H04W 84/10* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 10,785,652 | B1 * | 9/2020 | Ravindranath | H04W 12/48 |
| 12,177,776 | B2 * | 12/2024 | Liao | H04W 48/02 |
| 12,348,325 | B2 * | 7/2025 | Qiao | H04W 76/11 |
| 2019/0138337 | A1 | 5/2019 | Vegesna et al. | |
| 2022/0141192 | A1 | 5/2022 | Silveira et al. | |
| 2022/0360580 | A1 * | 11/2022 | Mishra | H04L 63/0876 |
| 2023/0006889 | A1 * | 1/2023 | Thyagaturu | H04L 41/5054 |
| 2023/0148302 | A1 * | 5/2023 | Ping | H04L 47/762 370/254 |
| 2023/0189187 | A1 * | 6/2023 | Velev | H04W 48/16 455/435.1 |
| 2023/0276211 | A1 * | 8/2023 | Kozlova | H04W 4/50 455/224 |
| 2023/0319700 | A1 * | 10/2023 | Prabhakar | H04W 84/12 455/432.1 |
| 2023/0337123 | A1 * | 10/2023 | Tsuda | H04L 67/51 |
| 2023/0345351 | A1 * | 10/2023 | Lindheimer | H04W 48/18 |
| 2024/0073974 | A1 * | 2/2024 | Srinivas | H04W 8/18 |
| 2024/0129816 | A1 * | 4/2024 | Zhang | H04W 36/0072 |
| 2024/0193021 | A1 * | 6/2024 | Pateromichelakis | G06F 9/547 |
| 2025/0351210 | A1 * | 11/2025 | Zia | H04W 48/18 |
| 2025/0358702 | A1 * | 11/2025 | Anghel | H04L 41/5012 |

OTHER PUBLICATIONS

5G-ACIA: "5G Non-Public Networks for Industrial Scenarios", White Paper, 5G ACIA, Jul. 2019 (Year: 2019).*

Li, Xi, et al. "Multi-domain solutions for the deployment of private 5G networks." IEEE Access 9 (2021): 106865-106884. (Year: 2021).*

Wen, Miaowen, et al. "Private 5G networks: Concepts, architectures, and research landscape." IEEE Journal of Selected Topics in Signal Processing 16.1 (2021): 7-25. (Year: 2021).*

Prados-Garzon, Jonathan, et al. "5G non-public networks: Standardization, architectures and challenges." IEEE Access 9 (2021): 153893-153908. (Year: 2021).*

ETSI-5G; Management and orchestration; Management of Non-Public Networks (NPN); Stage 1 and stage 2 (Year: 2023).*

Eswaran, Sivaraman, and Prasad Honnavalli. "Private 5G networks: a survey on enabling technologies, deployment models, use cases and research directions." Telecommunication Systems 82.1 (2023): 3-26. (Year: 2023).*

ETSI TS 123 501 V17.11.0 (Jan. 2024); 5G; System architecture for the 5G System (5GS) (Year: 2024).*

GSMA—Network Slicing Use Case Requirements; GSMA—2.0_Network-Slicing-Use-Case-Requirements-1 (Year: 2018).*

GSMA From Vertical Industry—3.0_Characterisation of Network Slices (Year: 2018).*

Neumann, Arne, Lukasz Wisniewski, and Jürgen Jasperneite. "5G into Profinet integration as a use case for network slicing." 2019 24th IEEE International Conference on Emerging Technologies and Factory Automation (ETFA). IEEE, 2019. (Year: 2019).*

Chahbar, Mohammed, et al. "A comprehensive survey on the E2E 5G network slicing model." IEEE Transactions on Network and Service Management 18.1 (2020): 49-62. (Year: 2020).*

J. Baranda et al., "5G-Transformer meets Network Service Federation: design, implementation and evaluation," 2020 6th IEEE Conference on Network Softwarization (NetSoft), Ghent, Belgium, 2020, pp. 175-179 (Year: 2020).*

Mohammed, Chnar Mustafa, and Salar Kheder Shaikhah. "A survey and analysis of architecture and models of network slicing in 5G." 2022 8th International engineering conference on sustainable technology and development (IEC). IEEE, 2022. (Year: 2022).*

GSMA 5G Transformation Hub—Vertical Industries—Helping Public and Private 5G to Work Together (Year: 2023).*

"3rd Generation Partnership Project; Technical Specification Group Services and System Aspects; System architecture for the 5G System (5GS); Stage 2 (Release 17)" 3GPP, Mar. 2021, 489 pp.

"3rd Generation Partnership Project; Technical Specification Group Services and System Aspects; System architecture for the 5G System (5GS); Stage 2 (Release 18)" 3GPP, Jul. 2023, 694 pp.

O-RAN Alliance, "O-RAN Architecture Description 7.0", Oct. 21, 2022, 38 pp., URL: https://orandownloadsweb.azurewebsites.net/specifications.

"Core Network and Interoperability Testing (INT); Methodologies for E2E Testing & Validation of Vertical Applications over 5G & Beyond networks", ETSI, May 6, 2022, 76 pp., Retrieved from the Internet on Dec. 17, 2024 from URL: http://www.etsi.org/deliver/etsi_tr/103700_103799/103761/01.01.01_60/tr_103761v010101p.pdf.

Extended Search Report from counterpart European Application No. 24182376.4 dated Dec. 19, 2024, 15 pp.

SA5 Chair, "OAM Agenda_with_Tdoc_sequence proposal", 3GPP TSG SA WGS (Telecom Management) Meeting #131e, May 25, 2020, 38 pp.

* cited by examiner

SERVICE MANAGEMENT AND ORCHESTRATION FOR PRIVATE AND PUBLIC MOBILE NETWORKS

TECHNICAL FIELD

The disclosure generally relates to mobile networks and, more specifically, to service management and orchestration for private and public mobile networks.

BACKGROUND

Computer networks have become ubiquitous, and the number of network applications, network-connected devices, and types of network-connected devices are rapidly expanding. Such devices now include computers, smartphones, Internet-of-Things (IoT) devices, vehicles, medical devices factory equipment, etc. 5G mobile network architectures enhanced the ability to provide communication services using cloud-based network function virtualization (NFV). Specialized networks can be created using the Radio Access Network (RAN) of a mobile network operator combined with functions of a 5G core. For example, networks can be created for a specific service level agreement (SLA), special use cases, or other specific requirements. Examples of such networks include private mobile networks, industrial networks, a dedicated network for connected vehicles, etc.

SUMMARY

In general, the disclosure describes techniques for a Private Mobile Network (PMN) orchestrator for mobile networks that enables extension of a private mobile network across a public mobile network, as well as providing corresponding management and orchestration functions for the private and public mobile networks. In some examples, the private and public mobile networks comprise one or more fifth-generation (5G) or next-generation (xG) mobile networks. For example, the PMN orchestrator receives, from an administrator via a user interface, information specifying one or more network functions for a private mobile network slice. The PMN orchestrator provisions the private mobile network slice within the private mobile network. Further, the PMN orchestrator generates and sends, to a controller for the public mobile network, one or more messages indicating the one or more network functions for the private mobile network slice and configuration information for the private mobile network slice. The one or more messages are configured to enable the public mobile network to provision a public mobile network slice extending the private mobile network slice. The public mobile network slice provisioned within the public mobile network operates as a "virtual" private mobile network slice that extends the resources and capabilities of the private mobile network slice provisioned within the private mobile network.

In some examples where RAN network functions are shared between a private mobile network and a public mobile network, the PMN orchestrator uses an extended Global System for Mobile communications Association (GSMA) Generic Network Slice Template (GST) defined to include a GSMA GST that is extended, in accordance with the techniques of the disclosure, to include attributes for one or more network functions of a mobile network slice. The PMN orchestrator generates an extended GSMA NEtwork Slice Type (NEST) by mapping the information specifying the one or more network functions for the private mobile network slice and the configuration information for the private mobile network slice to the extended GSMA GST. The extended GSMA NEST comprises a GSMA NEST extended, in accordance with the techniques of the disclosure, to include values for the attributes of the extended GSMA GST, the values specifying the one or more network functions for the private mobile network slice and the configuration information for the private mobile network slice. A controller (also referred to herein as a "management function") of the public mobile network, such as a Communication Service Management Function (CSMF) or a Network Services Management Function (NSMF), may use the extended GSMA NEST to provision a network slice in the public mobile network and also extend the network slice into the private mobile network based on the information specifying the one or more network functions for the private mobile network.

In some examples, the PMN orchestrator obtains one or more first metrics from the private mobile network slice and one or more second metrics from the corresponding public mobile network slice. The PMN orchestrator generates, based at least in part on the one or more first metrics and the one or more second metrics, one or more Key Performance Indicators (KPIs) representative of an aggregate performance of the private mobile network slice and the public mobile network slice. The PMN orchestrator compares the one or more KPIs representative of the aggregate performance of the private mobile network slice and the public mobile network slice to one or more pre-determined thresholds. In some examples, the one or more pre-determined thresholds are specified by one or more Service-Level Agreements (SLAs) for the private mobile network slice. In response to determining that the one or more KPIs representative of the aggregate performance of the private mobile network slice and the public mobile network slice do not satisfy the one or more pre-determined thresholds, the PMN orchestrator may perform one or more remedial actions. Such remedial actions may include, e.g., outputting an alarm to an administrator or reconfiguring at least one of the private mobile network and the public mobile network to adjust resources allocated to at least one of the private mobile network slice and the public mobile network slice.

In some examples, a PMN orchestrator as described herein is deployed within a cloud-based application, such as an rApp or xApp of a RAN Intelligent Controller (RIC) for a RAN of a mobile network. Such an rApp or xApp may be applications executed by, e.g., a non-real-time (non-RT) RIC or a near-real-time (near-RT) RIC, respectively. In some examples, the techniques of the disclosure enable a mobile network architecture that implements a common RIC (such as a shared non-RT RIC and/or a shared near-RT RIC) that provides common orchestration and management of both the private mobile network and the public mobile network. The use of such a shared RIC may enable the enforcement of differentiated, but coordinated, policies for enterprise users depending on the mobile network within which they operate.

The techniques of the disclosure may provide specific technical improvements to the computer-related field of computer networking and mobile telecommunications that are integrated into numerous practical applications. For example, the techniques of the disclosure may enable the implementation of "boundless" private mobile networks by allowing for joint orchestration of private mobile network and public mobile networks, including the seamless extension of private mobile networks across public mobile networks. Additionally, the techniques of the disclosure may improve scalability as well as reduce the administrative and technical difficulty of extending private mobile networks across public mobile networks by providing for a "single pane of glass" interface for deploying, managing, and orchestrating such mobile networks. Furthermore, the techniques of the disclosure may reduce network congestion and improve network performance and efficiency by allowing for the monitoring of compliance of KPIs of such private and public mobile networks, independently or in the aggregate, with SLA requirements, as well as enabling the adjustment of resources allocated to such mobile networks so as to improve compliance with such SLA requirements.

In one example, this disclosure describes a computing system comprising: storage media; and processing circuitry in communication with the storage media, the processing circuitry configured to execute a Private Mobile Network (PMN) orchestrator, wherein the PMN orchestrator is configured to: send, to a controller for a public mobile network, a message indicating one or more network functions for a private mobile network slice for a private mobile network and configuration information for the private mobile network slice, the message configured to enable the controller for the public mobile network to provision a public mobile network slice extending the private mobile network slice using the one or more network functions for the private mobile network slice.

In another example, this disclosure describes a method comprising: sending, by a Private Mobile Network (PMN) orchestrator executed by processing circuitry, and to a controller for a public mobile network, a message indicating one or more network functions for a private mobile network slice for a private mobile network and configuration information for the private mobile network slice, the message configured to enable the controller for the public mobile network to provision a public mobile network slice extending the private mobile network slice using the one or more network functions for the private mobile network slice.

In another example, this disclosure describes a non-transitory, computer-readable media comprising instructions that, when executed, are configured to cause processing circuitry to: execute a Private Mobile Network (PMN) orchestrator configured to: send, to a controller for a public mobile network, a message indicating one or more network functions for a private mobile network slice for a private mobile network and configuration information for the private mobile network slice, the message configured to enable the controller for the public mobile network to provision a public mobile network slice extending the private mobile network slice using the one or more network functions for the private mobile network slice.

The details of one or more examples are set forth in the accompanying drawings and the description below. Other features, objects, and advantages will be apparent from the description and drawings, and from the claims.

BRIEF DESCRIPTION OF DRAWINGS

Like reference characters refer to like elements throughout the figures and text.

DETAILED DESCRIPTION

Creating standalone private mobile networks at customer premises and allowing private mobile network users to roam on a public mobile network while the users are away from the users' premises is a major requirement for private mobile networks. Unfortunately, public mobile networks and private mobile networks are conventionally managed separately. Private and public mobile network management systems are disconnected. For example, creating a standalone private mobile network and a virtual private mobile network for the same customer requires manual work on separate management platforms, which results in segregated configuration data, performance data, telemetry data and operation support. This handicap prevents wide deployment of public mobile network-integrated private mobile networks.

Techniques are disclosed for an enhanced private mobile network management system that manages both stand-alone private mobile networks as well as virtual private mobile networks provisioned upon public mobile networks to create a boundless, dedicated, and isolated private mobile network experience. As described herein, a Private Mobile Network (PMN) Orchestrator (also referred to herein as a "PMN Manager" manages the network creation, network configuration, monitoring, and user configuration for one or more private mobile networks. In some examples, the PMN orchestrator may optionally collect and store telemetry data, such as logs, performance measurements (PMs), Key Performance Indicators (KPIs), and alarms, at a data lake. In some examples, the PMN orchestrator may optionally include an intelligent operation support system that analyses the real-time and/or stored telemetry data to create insights into issues or take automated corrective actions.

The techniques of the disclosure provide numerous advantages over conventional approaches. For example, the techniques of the disclosure enable a PMN orchestrator to provide a single pane of glass for configuration and monitoring of hybrid private mobile networks that include both physical and virtual components. In addition, the techniques of the disclosure enable a PMN orchestrator to create a single data lake for telemetry data on which intelligent operation support systems may run analysis and infer quality of experience optimization. Furthermore, the techniques of the disclosure enable a mobile network architecture that allows the use of a common RIC to enforce differentiated, but coordinated, policies for enterprise users depending on the mobile network within which they operate.

Figure 1A:
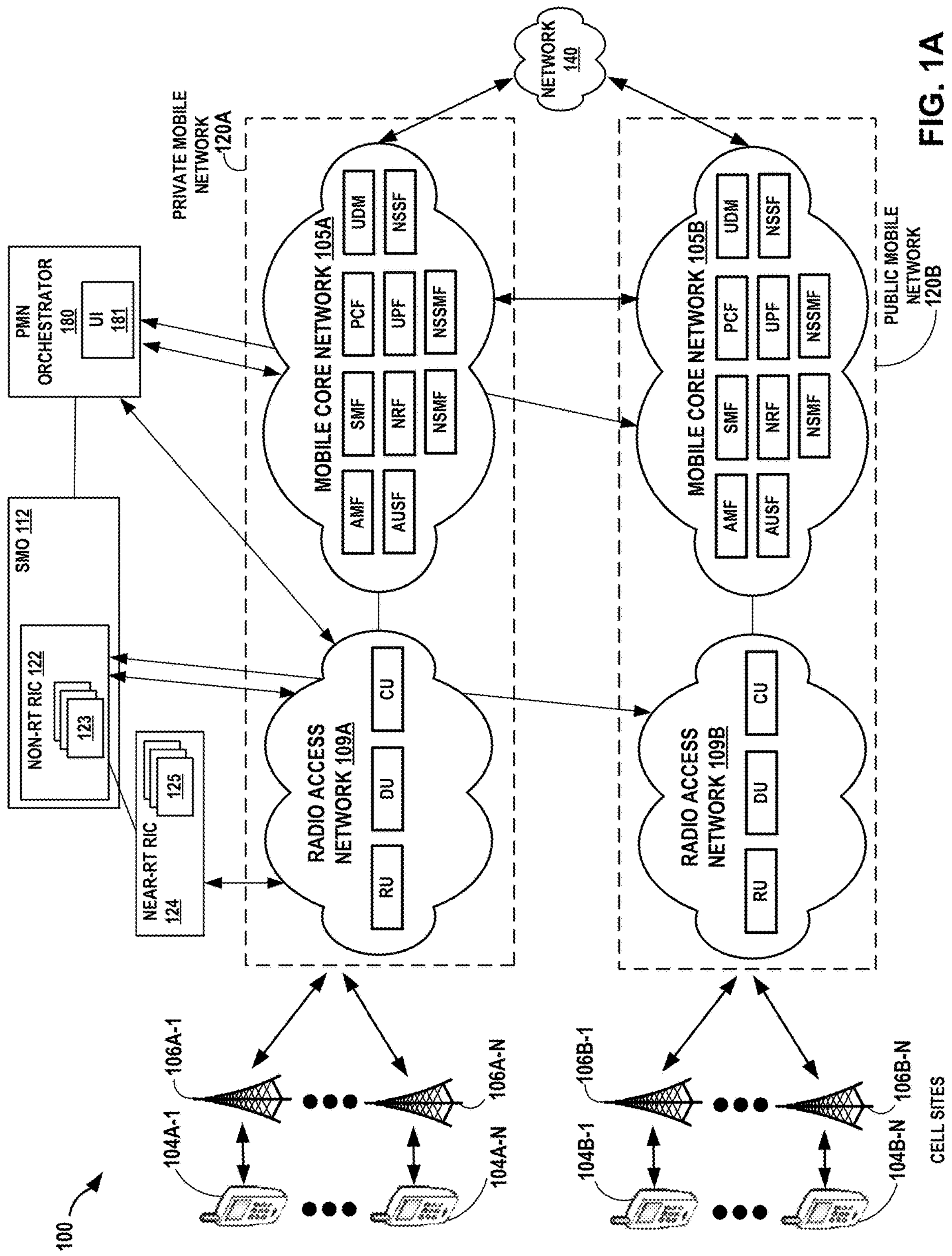
FIG. 1A is a block diagram illustrating an example network system configured to enable extension of a private mobile network across a public mobile network, in accordance with one or more techniques of the disclosure.

FIG. 1A is a block diagram illustrating an example network system configured to enable extension of a private mobile network across a public mobile network, in accordance with one or more techniques of the disclosure. In the example illustrated in FIG. 1A, network system 100 includes Service and Management Orchestrator (SMO) 112, non-RT RIC 122, near-RT RIC 124, private mobile network 120A, public mobile network 120B (collectively, "mobile networks 120"), and PMN orchestrator 180. Each mobile network 120 includes one or more respective radio access networks (RANs), e.g., RANs 109A-109B (collectively, "RANs 109"), and respective mobile core networks (or simply "cores") 105A-105B (collectively, "mobile core networks 105") that provide user equipment 104A-1-104A-N and 104B-1-104B-N (collectively, "UEs 104") with access to one or more applications or services provided by data network 140. In some examples, mobile networks 120 comprise 5G or xG mobile networks.

UEs 104 may represent smartphones, desktop computers, laptop computers, tablets, smart watches, and/or "Internet-of-Things" (IOT) devices, such as cameras, sensors, televisions, appliances, or the like. As shown in FIG. 1A, each mobile network 120 includes a respective RAN 109 that provides network access, data transport, and other services to UEs 104. In some examples, each of RANs 109 may be an Open Radio Access Network (O-RAN), a 5G mobile network RAN, a 4G LTE mobile network RAN, another type of RAN, or a combination of the above. For example, in a 5G-radio access network, each RAN 109 comprises a plurality of cell sites (or simply "cells") that each include radio equipment, such as respective base stations 106A-1-106A-N and 106B-1-106B-N (collectively, "base stations 106"), also known as gNodeBs, to exchange packetized data within a data network to ultimately access one or more applications or services provided by data network 140. Each of base stations 106 is divided into three functional components: radio unit (RU), distributed unit (DU), and central unit (CU), which can be deployed in various configurations. RU manages the radio frequency layer and has antenna arrays of various sizes and shapes. DU performs lower layer protocol processing. CU performs the upper layer protocol processing. Depending on operator and service requirements, base stations 106 can be deployed monolithically, e.g., RU, DU, and CU reside within a cell site, or these functionalities can be distributed across cell sites while the CU resides in an edge cloud site controlling a plurality of distributed DUs. O-RAN is, for example, an approach to networking in which disaggregated functions can be used to deploy mobile fronthaul and midhaul networks. The disaggregated functions can be cloud-based functions.

Each RAN 109 of a respective mobile network 120 connects to a respective core 105 to exchange packets with a respective data network 140. Core 105 may be a 5G core network, and data network 140 may represent, for example, one or more service provider networks and services, the Internet, third party services, one or more IP-VPNs, an IP-multimedia subsystem, a combination thereof, or other network or combination of networks. In some examples, resources associated with the service provided by a mobile network operator to the tenant may be provided by, or managed by, functions of core 105 and/or components of RAN 109. In some examples, core 105 implements various discrete control plane and user plane functions for network system 100. Examples of 5G control plane functions that may be provided by core 105 include Access Mobility Management Function (AMF) that provides access mobility management services, Session Management Function (SMF) that provides session management services, Policy Control Function (PCF) that provides policy control services, User Data Management (UDM) that provides management of network user data, Network Repository Function (NRF) that provides a repository that can be used to register and discover services in a network operator's network, Authentication Server Function (AUSF) that provides authentication services, Network Slice Selection Function (NSSF), NSMF that may be used to select an instance of an available network slice for use by any of UE devices 104, and Network Slice Subnet Management Function (NSSMF) that provides coordination, management, and orchestration of network slice subnet instances (NSSI). Core 105 may also include User Plane Functions (UPF) that provides packet routing, forwarding and other network data processing functions (e.g., Quality of Service, packet inspection, traffic optimization etc.). Further details on services and functions provided by the 5G core, can be found in 3$^{rd}$ Generation Partnership Project 2021, *Technical Specification Group Services and System Aspects; System architecture for the 5G System (5GS); Stage* 2 (*Release* 17), TS 23.501 V17.0.0 (2021 March), which is superseded by 2021, *Technical Specification Group Services and System Aspects; System architecture for the 5G System (5GS); Stage* 2 (*Release* 18), TS 23.501 V18.2.2 (2023 July), the entire contents of each of which are hereby incorporated by reference. Further details on the O-RAN architecture can be found in O-RAN Alliance, "O-RAN Architecture Description," version 7.00, October 2022, the entire contents of which is hereby incorporated by reference.

A network system, such as network system 100, may include a Service Management and Orchestration (SMO) framework offering various framework functions along with a non-RT RIC, configured in accordance with Open Radio Access Network (O-RAN) standards ("O-RAN architecture"), to manage and/or monitor aspects of a RAN and/or 5G core. The O-RAN architecture may include a non-RT RIC and a near-RT that each executes different functions and services for RAN functions. A non-RT RIC is an orchestration and automation function configured to provide radio resource management, higher layer procedure optimization, policy optimization, and provide guidance, parameters, policies and artificial intelligence (AI) and machine learning (ML) models to support the operation of near-RT RIC functions in the RAN. The non-RT RIC may onboard one or more applications (e.g., rApps) that provide non-real time (e.g., greater than one second) control of RAN elements and their resources, and the near-RT RIC may onboard one or more applications (e.g., xApps) that provide near-real time control of RAN elements and their resources.

The O-RAN architecture includes several interfaces, such as A1, O1, and O2 interfaces, that are each used to provide the functions and services by which the SMO and RIC can configure or direct other components of the RAN. For example, the functions and services of a non-RT RIC may include policy management services and/or enrichment information services for a near-RT RIC that are provided over an A1 interface (collectively referred to herein as "A1 services" because they provided over the A1 interface); Operations, Administration, and Management (OAM) services, such as performance management services and configuration management services, for O-RAN management elements that are provided over an O1 interface (referred to herein as "O1 services" because they are provided over the O1 interface); infrastructure management services and deployment management services for resources of an O-RAN cloud that are provided over an O2 interface (referred to herein as "O2 services" because they are provided over the O2 interface), and/or other services, such as service management and exposure (SME) services (e.g., registration of a service, update of a service registration), data management and exposure (DME) services, and/or AI/ML services.

As depicted in the example of FIG. 1A, aspects of RAN 109 and/or core 105 may be managed and/or monitored by SMO 112, non-RT RIC 122, and near-RT RIC 124. In some examples, SMO 112, non-RT RIC 122, and near-RT RIC 124 may be operated by the mobile network operator providing 5G services to a tenant. SMO 112 can orchestrate and control management and automation aspects of RAN 109 (e.g., network slicing, management, and orchestration of O-Cloud, etc.). Further, SMO 112 may control aspects of non-RT RIC 122 and near-RT RIC 124. Non-RT RIC 122 can provide non-real-time (e.g., greater than one second) control and optimization of RAN elements and resources such as RUs, DUs, and CUs, workflow management, and policy-based control of applications and features of near-RT RIC 124. Near-RT RIC 124 can provide near-real-time (e.g., milliseconds) control and optimization of RAN elements and resources via fine-grained data collection and actions. As further described in FIG. 1B, non-RT RIC 122 and near-RT RIC 124 may deploy as a highly scalable, micro-services based containerized architecture. In some examples, near-RT RIC 124 may be located within an edge or regional cloud.

Non-RT RIC 122 may onboard one or more applications, e.g., applications 123 (e.g., rApps of FIG. 1B) that manage non-real time events within non-RT RIC 122, such as applications that do not require response times of less than one second. Applications 123 may leverage the functionality exposed via the non-RT RIC framework of non-RT RIC 122. Applications 123 may be used to control and manage RAN elements and resources, such as near-RT RIC 124, RAN nodes, and/or resources in the O-RAN cloud. Applications 123 may also utilize network data, performance metrics, and subscriber data to provide recommendations for network optimization and operational guidance (e.g., policies) to one or more applications of near-RT RIC 124. Although illustrated as within non-RT RIC 122, any one or more of applications 123 may be executed by a third party, separate from non-RT RIC 122.

As described further below, non-RT RIC 122 may provide services using A1, O1, and O2 interfaces. An A1 interface connects the non-RT RIC 122 and near-RT RIC 124. Non-RT RIC 122 may perform services via the A1 interface, such as policy management services (e.g., creation and update of a policy), ML model management services, and/or enrichment information services. Services performed via the A1 interface are referred to herein as "A1 services." An O1 interface may include an interface that connects SMO 112 with O-RAN managed elements, such as near-RT RIC 124 and/or RAN nodes (e.g., O-RAN centralized unit (O-CU), O-RAN distributed unit (O-DU)). Non-RT RIC 122 may perform services via the O1 interface, such as configuration management services and performance management services of O-RAN managed elements (e.g., operation and maintenance (OAM) services), fault supervision, file management, heartbeat, trace, physical network function (PNF) discovery, software management, etc.). Services performed via the O1 interface are referred to herein as "O1 services."

An O2 interface may include an interface that connects SMO 112 to resources of the ORAN O-Cloud. The O-Cloud may comprise of one or more physical infrastructure nodes that host O-RAN functions (e.g., virtual network functions), the supporting software components, and the appropriate management and orchestration functions. Non-RT RIC 122 may perform services via the O2 interface, such as services that provide infrastructure management and/or network function deployment of the resources in the O-Cloud (e.g., discovery and administration of O-Cloud resources; Scale-In, Scale-Out of cloud/deployments; Fault, Configuration, Accounting, Performance, and Security (FCAPS) of cloud/deployments, software management of cloud platform/deployments; create/delete deployment and associated allocated O-Cloud resources). Services performed via the O2 interface are referred to herein as "O2 services." Non-RT RIC 122 may also perform other functions and services, such as service management and exposure (SME) services (e.g., registration of a service, update of a service registration), data management and exposure (DME) services, AI/ML services, or the like.

In accordance with the techniques of the disclosure, PMN orchestrator 180 enables the extension of network slices provisioned within private mobile network 120A across public mobile network 120B. For example, PMN orchestrator 180 provisions a public network slice within public mobile network 120B, which serve as a "virtual" private network slice extending the capabilities of resources of a corresponding private network slice provisioned within private mobile network 120A. PMN orchestrator 180 further provides corresponding management and orchestration functions for private mobile network 120A and public mobile network 120B. PMN orchestrator 180 operates to orchestrate and deploy RAN network functions and network functions of private mobile network 120A and public mobile network 120B, as well as the transport connectivity between private mobile network 120A and public mobile network 120B. In some examples, PMN orchestrator 180 operates to trigger the creation of one or more network slices on public mobile network 120B as a northbound consumer of a CSMF of private mobile network 120A.

In the use case of dedicated RAN network functions for private mobile network 120A, PMN orchestrator 180 may operate to trigger the mapping of network slice configuration between private mobile network 120A and public mobile network 120B. In the use case of shared RAN network functions for private mobile network 120A, PMN orchestrator 180 may additionally provide details regarding the network functions (e.g., AMF, UPF, etc.) of a private mobile network slice of private mobile network 120A to the CSMF or NSMF of public mobile network 120B to enable the CSMF or NSMF of public mobile network 120B to create or configure a corresponding public mobile network slice. In some examples, the network functions include one or more core network functions of private mobile network 120A. In some examples, the network functions include one or more access network functions of private mobile network 120A, such as one or more RAN network functions.

For example, PMN orchestrator 180 provides a user interface (UI) 181 with which an administrator for private mobile network 120A may configure a private network slice to be provisioned within private mobile network 120A. For example, PMN orchestrator 180 receives, from an administrator via UI 181, information specifying one or more network functions for a private mobile network slice to be provisioned within private mobile network 120A. In some examples, PMN orchestrator 180 provisions the private mobile network slice within private mobile network 120A in accordance with the specified one or more network functions for the private mobile network slice. In some examples, PMN orchestrator 180 configures a CSMF or NSMF of private mobile network 120A to provision the private mobile network slice in accordance with the specified one or more network functions for the private mobile network slice.

Based at least in part on the information specifying the one or more network functions for the private mobile network slice, PMN orchestrator 180 generates and sends, to a controller for public mobile network 120B, a message indicating the one or more network functions for the private mobile network slice and further including configuration information for the private mobile network slice. In some examples, PMN orchestrator 180 sends the message to a controller (e.g., a management function), such as a CSMF or NSMF, of public mobile network 120B. The message is configured to enable the controller for public mobile network 120B to provision a public mobile network slice extending the private mobile network slice. The CSMF or NSMF of public mobile network 120B may provision a public mobile network slice extending the private mobile network slice based at least in part on the one or more network functions and configuration information for the private mobile network slice specified by the extended GSMA NEST. The public mobile network slice provisioned within public mobile network 120B operates as a "virtual" private mobile network slice that extends the resources and capabilities of the private mobile network slice provisioned within private mobile network 120A.

In the example of FIG. 1A, a single non-RT RIC 122 and near-RT RIC 124 provide control and optimization of RAN elements and resources for each of mobile networks 120. However, instead of a single non-RT RIC 122 and near-RT RIC 124 as depicted in FIG. 1A, in other implementations of the techniques of the disclosure, each mobile network 120 may include a respective non-RT RIC and near-RT RIC that provide control and optimization of RAN elements and resources for only the respective mobile network 120.

Figure 1B:
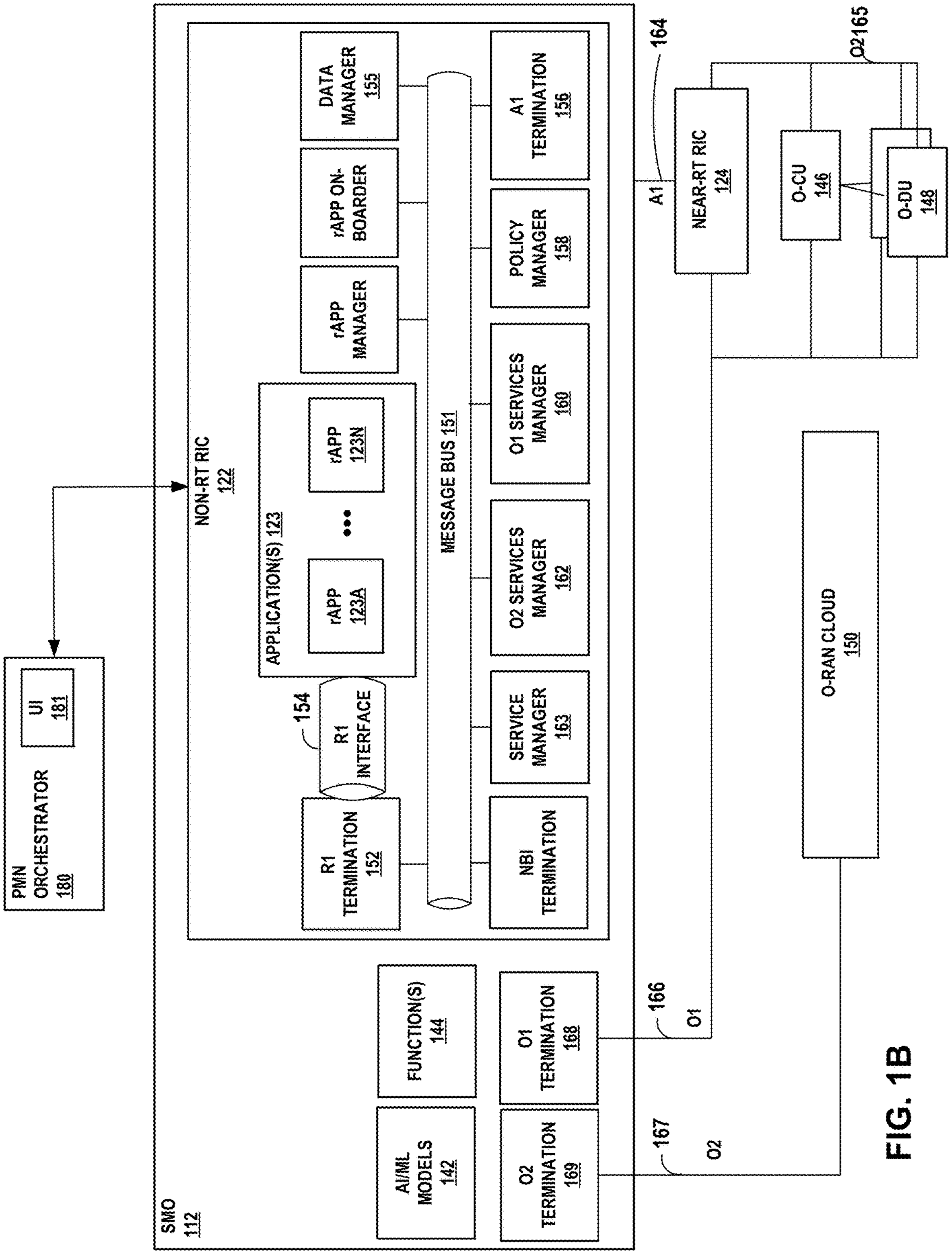
FIG. 1B is a block diagram illustrating further example details of the Non-RT RIC of the Service Management and Orchestration of FIG. 1A.

FIG. 1B is a block diagram illustrating further example details of the non-RT RIC 122 of FIG. 1A. In the example illustrated in FIG. 1B, SMO 112 may include non-RT RIC 122, one or more AI/ML models 142, one or more functions 144 (e.g., NSSMF, NFMF, and other functions), and open interfaces, such as O1 termination interface 168 and O2 termination interface 169. SMO 112 may manage non-RT RIC 122, near-RT RIC 124, O-RAN managed elements (e.g., centralized unit (O-CU) 146, O-RAN decentralized unit (O-DU) 148 of one or more base stations), and resources in O-RAN cloud 150.

Non-RT RIC 122 may provide non-real-time (e.g., greater than one second) control and optimization of RAN elements and resources such as RUs, DUs, and CUs, workflow management, and policy-based control of applications and features of near-RT RIC 124. Non-RT RIC 122 may be deployed as a highly scalable, microservices based containerized architecture. In this example, non-RT RIC 122 may onboard, deploy, and/or terminate one or more applications, e.g., rApp 123A through rApp 123N (collectively "applications 123"). Applications 123 may represent applications that leverage the functionality exposed via the framework of non-RT RIC 122. Applications 123 may provide non-RT RIC 122 with non-real time (e.g., greater than one second) control of RAN elements and their resources. Applications 123 may provide services for radio resource management, higher layer procedure optimization, policy optimization, and providing guidance, parameters, policies, and AI/ML models to support the operation of RAN functions.

For example, applications 123 may provide A1 services that provide and facilitate RAN operations and optimization of near-RT RIC 124, such as providing operational guidance (e.g., policies), enrichment information (e.g., forecasts), and AI/ML services. A1 services may include policy management services such as creating, updating, and/or deleting of A1 policies; receiving policy feedback; querying policy types, identifiers, and status; defining which policy types are supported by near-RT RIC 124; and registering applications (xApps) of near-RT RIC 124 to specific policy types. A1 services may include enrichment information services, such as providing data for model training of AI/ML models, such as forecasts and/or data analytics.

Applications 123 may provide O1 services that provide configuration management or performance management of O-RAN managed entities, such as near-RT RIC 124 and/or RAN nodes, e.g., O-CU 146, O-DU 148 (also referred to herein as "E2 nodes"). O1 services may provide configuration management services to create, update, and/or delete configurations to O-RAN managed entities. For example, configuration management services may include provisioning operations (e.g., for NSS and NF provisioning) to create a managed object instance (MOI), obtain MOI attributes, modify MOI attributes, and/or delete the MOI. O1 services may also provide performance management services that monitor the status of elements or components in the O-RAN managed entities. For example, non-RT RIC 122 may create, modify, or delete performance management jobs to receive performance metrics, or send heartbeat messages to monitor the status and/or availability of services of RAN nodes or to send trace messages to monitor link failures. O1 services may also provide file management, such as to push files to the RAN nodes (e.g., software updates, beamforming configuration files, ML models, security certificates, etc.).

Applications 123 may provide O2 services that provide infrastructure management and/or network function deployment of resources in O-RAN cloud 150 (also referred to herein as "O-Cloud 150"). O2 services may provide discovery and administration of O-Cloud resources; Scale-In, Scale-Out of cloud/deployments (e.g., deploying resources with more or less processors); FCAPS of cloud/deployments, software management of cloud platform/deployments; create/delete deployment and associated allocated O-Cloud resources.

Applications 123 may provide service management and exposure (SME) services, data management and exposure (DME) services, and/or other services. SME services may provide services that enable services provided over an internal interface (R1 interface 154) of non-RT RIC 122 and their exposure and extensibility through services including bootstrap, service registration/deregistration or updates to service registration, service discovery or notification, heartbeat, authentication, authorization, etc. Data management and exposure (DME) services may include services that manage data and their exposure between applications 123. For example, applications 123 may have different functions, such as application 123A configured to collect and analyze data, application 123B configured to generate an ML model based on the results of the analysis, and application 123N configured to make a prediction or inference using the ML model and/or to generate controls for RAN nodes based on the prediction or inference. DME services may manage the data shared between applications 123, such as the collection of data, the processing of the data, and/or the advertisement of the data.

Non-RT RIC 122 may include one or more managers to process the A1, O1, O2, SME, DME services, and other services. For example, non-RT RIC 122 may include a policy manager 158, O1 services manager 160, O2 services manager 162, service manager 163, and data manager 155. Non-RT RIC 122 may include other managers, such as an application manager and an application on-boarder, that are configured to manage the installation and deployment of applications 123.

Policy manager 158 is configured to control the deployment of policies (e.g., A1 services). For example, in response to receiving requests for A1 services from applications 123 via R1 interface 154, R1 interface 154 sends the requests to policy manager 158 via message bus 151. Policy manager 158 may process the A1 services and may send the A1 services to A1 termination 156 via message bus 151, which provides the A1 services to near-RT RIC 124 via A1 interface 164. In some examples, the A1 interface may implement an ALAP application protocol based on the O-RAN specifications.

O1 services manager 160 is configured to control the deployment of O1 services for monitoring the performance of near-RT RIC 124 and/or RAN nodes (e.g., O-CU 146, O-DU 148). For example, in response to receiving requests for O1 services for monitoring the performance of near-RT RIC 124 from applications 123 via R1 interface 154, R1 interface 154 sends the requests to O1 services manager 160 via message bus 151. O1 services manager 160 may process the O1 services and may send the O1 services to O1 termination 168, which provides the O1 services to near-RT RIC 124 via O1 interface 166. In some examples, the O1 interface may implement REST/HTTPS APIs and/or NETCONF.

O1 services manager 160 is additionally, or alternatively, configured to control the deployment of O1 services for the configuration of near-RT RIC 124 and/or RAN nodes. For example, in response to receiving requests for O1 services for the configuration of near-RT RIC 124 from applications 123 via R1 interface 154, R1 interface 154 sends the requests to O1 services manager 160. O1 services manager 160 may process the O1 services and may send the O1 services to O1 termination 168, which provides the O1 services to near-RT RIC 124 via O1 interface 166.

O2 services manager 162 may be configured to control the deployment of O2 services for monitoring the performance of resources of O-Cloud 150. For example, in response to receiving requests for O2 services for monitoring the performance of resources within O-Cloud 150 via R1 interface 154, R1 interface 154 sends the request to O2 services manager 162. O2 services manager 162 may process the O2 services and may send the O2 services to O2 termination 169, which provides the O2 services to resources of O-Cloud 150 via O2 interface 167.

O2 services manager 162 may additionally, or alternatively, be configured to control the deployment of O2 services for the configuration of resources of O-Cloud 150. For example, in response to receiving requests for O2 services for configuring resources within O-Cloud 150 from applications 123 via R1 interface 154, R1 interface 154 sends the requests to O2 services manager 162. O2 services manager 162 may process the O2 services and may send the O2 services to O2 termination 169, which provides the O2 services to resources of O-Cloud 150 via O2 interface 167.

In some examples, R1 interface 154 also exposes applications 123 to SME services, DME services, and/or other services. For example, in response to receiving requests for SME services from applications 123 via R1 interface 154, R1 interface 154 sends the requests to service manager 163. Service manager 163 may process the SME services (e.g., register/update a service) and may send the SME services to R1 termination 152, which provides the SME services to applications 123 via R1 interface 154 (e.g., sending response to application regarding service registration, update, or discovery). Similarly, in response to receiving requests for DME services from applications 123 via R1 interface 154, R1 interface 154 sends the requests to data manager 155. Data manager 155 may process the DME services and may send the DME services to R1 termination 152, which provides the DME services to applications 123 via R1 interface 154 (e.g., sending data from application configured as a data producer to application configured as a data consumer).

R1 interface 154 may also expose applications 123 to slice subnet management services, such as RAN NSSMF interfaces to retrieve slice service level agreements (SLAs) and slice topologies, and/or slice management, SLA, and slice performance management notifications to applications 123.

In accordance with the techniques of the disclosure, PMN orchestrator 180 enables the extension of network slices provisioned within private mobile network 120A of FIG. 1A across public mobile network 120B of FIG. 1A. For example, PMN orchestrator 180 provisions a public network slice within public mobile network 120B, which serve as a "virtual" private network slice extending the capabilities of resources of a corresponding private network slice provisioned within private mobile network 120A. PMN orchestrator 180 further provides corresponding management and orchestration functions for private mobile network 120A and public mobile network 120B. For example, PMN orchestrator 180 receives, from an administrator via UI 181, information specifying one or more network functions for a private mobile network slice to be provisioned within private mobile network 120A. In some examples, PMN orchestrator 180 provisions the private mobile network slice within private mobile network 120A in accordance with the specified one or more network functions for the private mobile network slice. In some examples, PMN orchestrator 180 configures a CSMF or NSMF of private mobile network 120A to provision the private mobile network slice in accordance with the specified one or more network functions for the private mobile network slice.

Additionally, PMN orchestrator 180 generates and sends, to a controller for public mobile network 120B, a message indicating the one or more network functions for the private mobile network slice and configuration information for the private mobile network slice. The message is configured to enable the controller for public mobile network 120B to provision a public mobile network slice extending the private mobile network slice. The public mobile network slice provisioned within public mobile network 120B operates as a "virtual" private mobile network slice that extends the resources and capabilities of the private mobile network slice provisioned within private mobile network 120A.

Figure 1C:
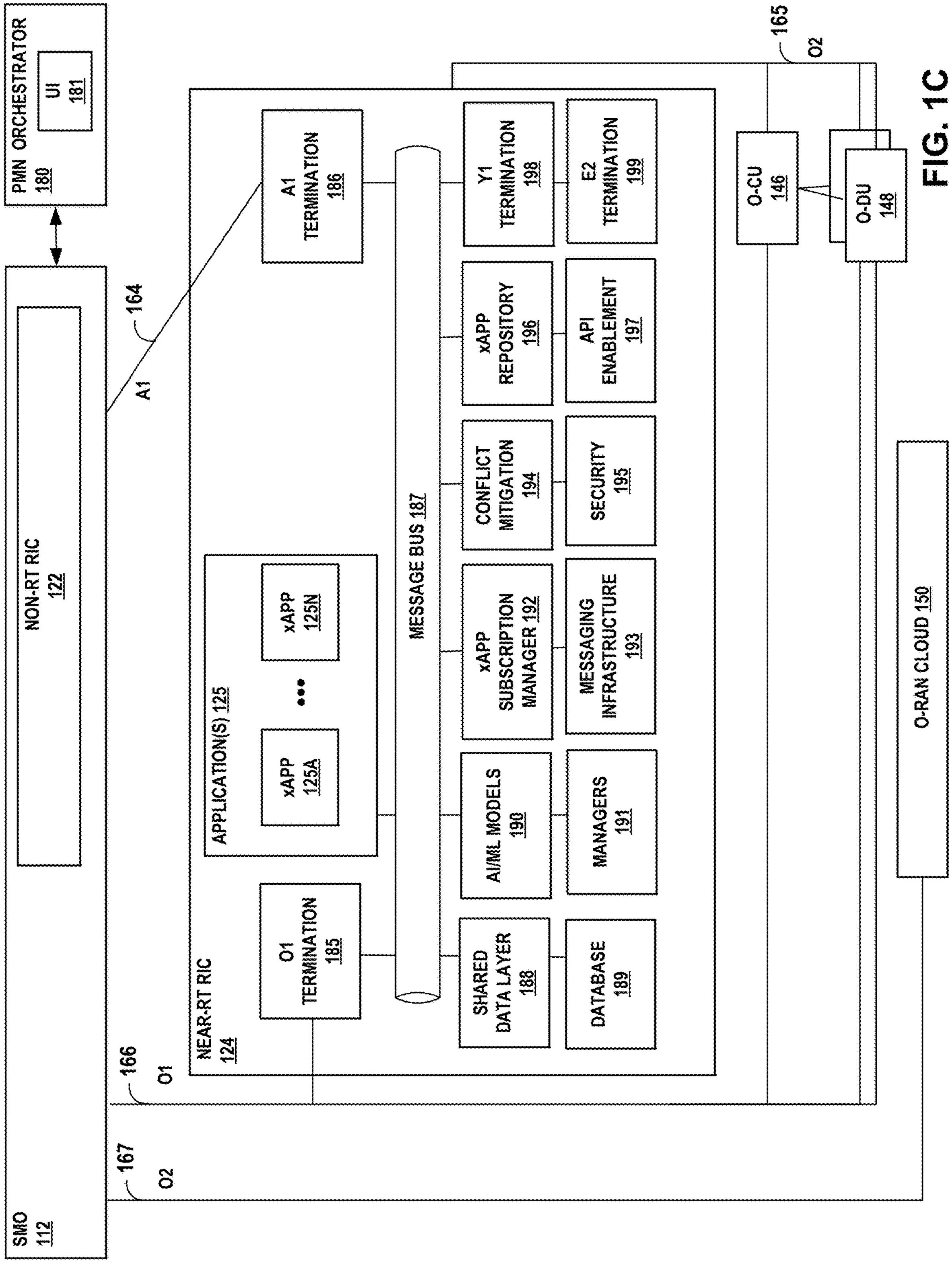
FIG. 1C is a block diagram illustrating further example details of the Near-RT RIC of FIG. 1A.

FIG. 1C is a block diagram illustrating further example details of the Near-RT RIC of FIG. 1A. In the example illustrated in FIG. 1C, near-RT RIC 124 includes shared data layer 188, database 189, one or more AI/ML models 190, managers 191, xApp subscription manager 192, messaging infrastructure 193, conflict mitigation 194, security 195, xApp repository 196, message bus 187, API enablement 197, and open interfaces, such as O1 termination 185, A1 termination 186, Y1 termination 198, and E2 termination 199.

Near-RT RIC 124 can provide near-real-time (e.g., milliseconds) control and optimization of RAN elements and resources, such as O-CU 146 and/or O-DU 148, via fine-grained data collection and actions performed via E2 interface 199. For example, near-RT RIC 124 may onboard one or more applications 125 (e.g., xApps 125A-125N of FIG. 1C, collectively, "xApps 125") that provide near-real time control of RAN elements and their resources.

Near-RT RIC 124 may be deployed as a highly scalable, microservices based containerized architecture. Near-RT RIC 124 may onboard one or more applications, e.g., applications 125 (e.g., xApps 125) that manage near-real time events within near-RT RIC 124. Applications 125 may leverage the functionality exposed via the near-RT RIC framework of near-RT RIC 124. Near-RT RIC 124 may enforce policies received from applications 123 of non-RT RIC 122 and may provide policy feedback to non-RT RIC 122. Although illustrated as within near-RT RIC 124, any one or more of applications 125 may be executed by a third party, separate from near-RT RIC 124.

Shared Data Layer 188 and database 189 enable near-RT RIC 124 to maintain and expose RAN/UE information and other information required to support specific use cases. In some examples, database 189 maintains a list of UEs and associated data, and perform tracking and correlation of the UE identities associated with the connected E2 Nodes. In some examples, database 189 maintains configurations and near real-time information relating to connected E2 Nodes and the mappings between them. In some examples, Shared Data Layer 188 and database 189. Such information may be generated and accessed by near-RT RIC 124 or authorized xApps 125. Shared Data Layer 188 provides SDL services for xApps 125, which can be used to subscribe to database notifications and to read, write and modify information stored on database 189. Use-case specific information may be exposed using the services provided by Shared Data Layer 188.

Managers 191 include OAM management, which provides fault, configuration, accounting, performance, file, security and other management plane services. Managers 191 of near-RT RIC 124 provide several capabilities to support OAM management services. For example, managers 191 provide fault management, including Near-RT RIC Fault Supervision MnS over the O1 interface. Further, managers 191 provide configuration management, including Near-RT RIC Provisioning MnS over the O1 interface.

In some examples, managers 191 perform logging, tracing, and metrics collection functions. Logging is to capture information needed to operate, troubleshoot and report on the performance of near-RT RIC 124 and its constituent components. Log records may be viewed and consumed directly by users and systems, indexed and loaded into a data storage, and used to compute metrics and generate reports. Near-RT RIC components log events according to a common logging format. Different logs can be generated (e.g., audit log, metrics log, error log and debug log). Tracing mechanisms are used to monitor the transactions or a workflow. An example subscription workflow can be broken into two traces namely, a subscription request trace followed by a response trace. Individual traces can be analyzed to understand timing latencies as the workflow traverses a particular Near-RT RIC component. Metrics are collected and reported for performance and fault management specific to each xApp logic and other internal functionalities are collected and published for authorized consumer (e.g., SMO).

Near-RT RIC 124 includes xApp subscription manager 192. xApp subscription manager 192 enables near-RT RIC 124 to handle subscription requests from different xApps 125 for, e.g., E2-related data, and provides unified data distribution to xApps 125 for those data. xApp subscription manager 192, in some examples, manages subscriptions from xApps to E2 nodes. xApp subscription manager 192 may enforce authorization of policies controlling xApp 125 access to messages. Further, xApp subscription manager 192 enables merging of identical subscriptions from different xApps 125 into a single subscription toward an E2 Node.

Conflict mitigation 194 enables near-RT RIC 124 to detect and resolve potentially overlapping or conflicting requests from multiple xApps 125. In the context of near-RT RIC 124, conflict mitigation 194 addresses conflicting interactions between different xApps 125. An application may change one or more parameters with the objective of optimizing a specific metric. Conflict mitigation 194 may reduce, mitigate, or avoid instances wherein xApps 125 chose or configure objectives such that they result in conflicting actions.

Messaging infrastructure 193 enables near-RT RIC 124 with low-latency message delivery between Near-RT RIC internal endpoints. Messaging infrastructure 193 supports registration of endpoints, wherein endpoints register themselves to messaging infrastructure 193. Messaging infrastructure 193 further supports discovery of endpoints, wherein endpoints are discovered by messaging infrastructure 193 initially and registered to messaging infrastructure 193. Messaging infrastructure 193 also supports deletion of endpoints, wherein endpoints are deleted once they are not used anymore. Messaging infrastructure 193 may provide an API for sending messages to messaging infrastructure 193 and an API for receiving messages from messaging infrastructure 193. Messaging infrastructure 193 supports multiple messaging modes, e.g., point-to-point mode (e.g., message exchange among endpoints), publish/subscribe mode (e.g., real-time data dispatching from E2 termination 199 to multiple subscriber xApps 125). Messaging infrastructure 193 provides message routing, namely according to the message routing information, messages can be dispatched to different endpoints. Messaging infrastructure 193 supports message robustness to avoid data loss during a messaging infrastructure outage/restart or to release resources from the messaging infrastructure once a message is outdated.

Near-RT RIC 124 includes security 195. Security 195 prevent malicious xApps 125 from abusing radio network information (e.g., exporting to unauthorized external systems) and/or control capabilities over RAN functions.

Near-RT RIC 124 includes termination for various interfaces, including E2 termination 199, A1 termination 186, O1 termination 185, and Y1 termination 198. E2 termination 199 enables termination of an E2 interface. E2 termination 199 may terminate an SCTP connection from each E2 Node. E2 termination 199 may also route messages from xApps 125 through the SCTP connection to an E2 Node. E2 termination 199 may further decode the payload of an incoming ASN.1 message enough to determine message type. In some examples, E2 termination 199 handles incoming E2 messages related to E2 connectivity and receives and responds to an E2 Setup Request from an E2 Node. Furthermore, E2 termination 199 may notify xApps 125 of a list of RAN functions supported by an E2 Node based on information derived from the E2 Setup and RIC Service Update procedures, and may notify the newly connected E2 Node of the list of accepted functions.

A1 termination 186 enables termination of the A1 interface. A1 termination 186 provides a generic API by means of which Near-RT RIC 124 can receive and send messages via an A1 interface. These include, e.g., A1 policies and enrichment information received from Non-RT RIC 122, or A1 policy feedback sent towards Non-RT RIC 122. A1 termination 186 may further send an A1 policy that is set or updated by Non-RT RIC 122 to suitable xApp(s) 125 based on a list of candidate xApps 125 provided by xApp Repository 196.

O1 termination 185 enables termination of the O1 interface. Near-RT RIC 124 communicates with SMO 112 via O1 interface 166 and exposes O1-related management services from Near-RT RIC 124. For O1 management services (MnS), near-RT RIC 124 is an MnS producer and SMO 112 is an MnS consumer. Near-RT RIC 124 exposes provisioning management services from Near-RT RIC 124 to an O1 provisioning management service consumer, translates O1 management services to internal APIs of near-RT RIC 124, exposing FM services to report faults and events from near-RT RIC 124 to an O1 FM service consumer, exposes PM services to report bulk and real-time PM data from near-RT RIC 124 to an O1 PM service consumer, exposes file management services to download ML files, software files, etc. and upload log/trace files to/from file MnS consumer, and exposes communication surveillance services to the O1 communication surveillance service consumer.

Y1 termination 198 enables termination of the Y1 interface. Y1 termination 198 provides support for exposing RAN analytics information from Near-RT RIC 124 to Y1 consumers.

Near-RT RIC 124 may include one or more managers to process the O1, A1, Y1, and E2 services, and other services. Near-RT RIC 124 may include other managers, such as an application manager and an application on-boarder, that are configured to manage the installation and deployment of applications 125.

API enablement 197 provide APIS for near-RT RIC 124. The near-RT RIC APIs can be categorized based on the interaction with near-RT RIC 124 and can be related to E2-related services, A1-related services, Management related services, and SDL services. This functionality provides support for registration, discovery and consumption of near-RT RIC APIs within the near-RT RIC scope. In particular, API enablement 197 provides services including repository and registry services for near-RT RIC APIs, services that allow discovery of the registered near-RT RIC APIs, services to authenticate xApps 125 for use of the near-RT RIC APIs, services that enable generic subscription and event notification, and functionality to avoid compatibility clashes between xApps 125 and the services they access. In some examples, API enablement 197 provides API enablement services that are accessed by xApps 125 via one or more enablement APIs.

AI/ML models 190 enables near-RT RIC 124 with data pipelining, model management, training and inference, which constitute complete AI/ML workflow support for xApps 125 to implement AI/ML algorithms. xApps 125 may use none, part, or all of this functionality, depending on its design. In some examples, AI/ML models 190 include data pipelining, which performs data ingestion and preparation for xApps 125. AI/ML models 190 may provide generic and use case-independent capabilities to AI/ML-based xApps 125 that may be useful to multiple use cases. The input data for training may come from an xApp-specific space (e.g., dedicated space in database).

xApp Repository 196 maintaining a list of candidate xApp(s) to A1 Termination 186 for sending A1 policy or policy update to suitable xApp(s) 125 based on policy type and operator policies. In addition, xApp Repository 196 maintains the policy types supported in near-RT RIC 124. The supported policy types are based on policy types supported by the registered xApps 125 and operator policies. Further, xApp Repository 196 performs xApp access control to requested A1-E1 type based on operator policies.

In accordance with the techniques of the disclosure, PMN orchestrator 180 enables the extension of network slices provisioned within private mobile network 120A of FIG. 1A across public mobile network 120B of FIG. 1A. For example, PMN orchestrator 180 provisions a public network slice within public mobile network 120B, which serve as a "virtual" private network slice extending the capabilities of resources of a corresponding private network slice provisioned within private mobile network 120A. PMN orchestrator 180 further provides corresponding management and orchestration functions for private mobile network 120A and public mobile network 120B. For example, PMN orchestrator 180 receives, from an administrator via UI 181, information specifying one or more network functions for a private mobile network slice to be provisioned within private mobile network 120A. In some examples, PMN orchestrator 180 provisions the private mobile network slice within private mobile network 120A in accordance with the specified one or more network functions for the private mobile network slice. In some examples, PMN orchestrator 180 configures a CSMF or NSMF of private mobile network 120A to provision the private mobile network slice in accordance with the specified one or more network functions for the private mobile network slice.

Additionally, PMN orchestrator 180 generates and sends, to a controller for public mobile network 120B, a message indicating the one or more network functions for the private mobile network slice and configuration information for the private mobile network slice. The message is configured to enable the controller for public mobile network 120B to provision a public mobile network slice extending the private mobile network slice. The public mobile network slice provisioned within public mobile network 120B operates as a "virtual" private mobile network slice that extends the resources and capabilities of the private mobile network slice provisioned within private mobile network 120A.

Figure 2:
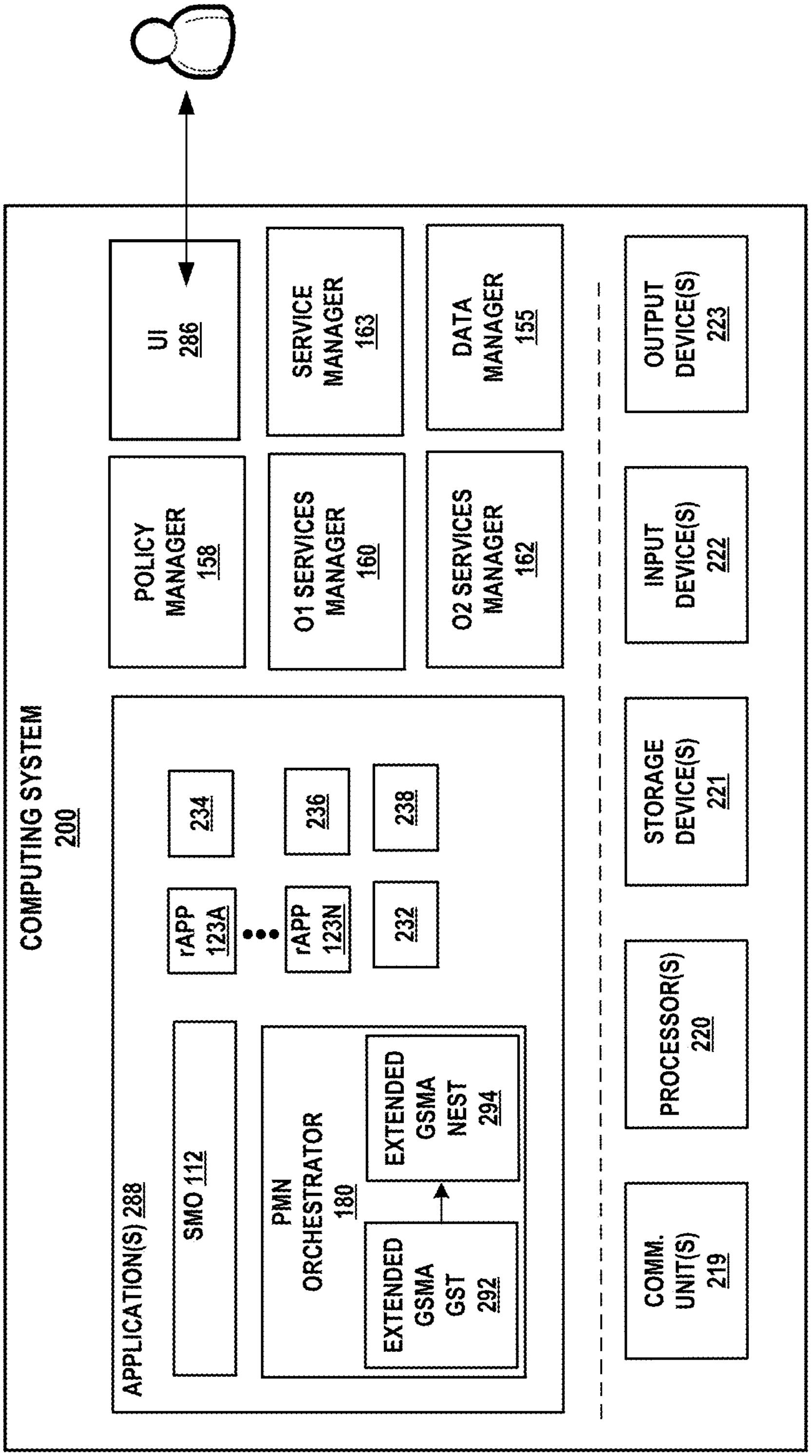
FIG. 2 is a block diagram illustrating an example computing system in detail, in accordance with the techniques of this disclosure.

FIG. 2 is a block diagram illustrating example computing system 200 in detail, in accordance with techniques of this disclosure. In this example of FIG. 2, computing system 200 may implement, for example, an SMO 112 and/or a non-real time RIC, such as non-RT RIC 122 of FIGS. 1A-IC.

Computing system 200 includes processing circuitry 220, one or more input devices 222, one or more output devices 223, one or more communication units 219, and one or more storage device(s) 221. In some examples, computing system 200 is a cloud computing system, server farm, and/or server cluster (or portion thereof) that provides services to client devices and other devices or systems. In other examples, computing system 200 may be implemented through one or more virtualized compute instances (e.g., virtual machines, containers) of a data center, cloud computing system, server farm, and/or server cluster.

One or more of the devices, modules, storage areas, or other components of computing system 200 may be interconnected to enable inter-component communications (physically, communicatively, and/or operatively). In some examples, such connectivity may be provided by communication channels, a system bus (e.g., message bus 151 of FIG. 1B), a network connection, an inter-process communication data structure, or any other method for communicating data.

Processing circuitry 220 of computing system 200 may implement functionality and/or execute instructions associated with an SMO and/or a non-RT RIC or associated with one or more modules illustrated herein and/or described herein, including applications 288, policy manager 158, O1 services manager 160, O2 services manager 162, service manager 163, and data manager 155. Processing circuitry 220 may be, may be part of, and/or may include processing circuitry that performs operations in accordance with one or more aspects of the present disclosure. Examples of processing circuitry 220 include microprocessors, application processors, display controllers, auxiliary processors, one or more sensor hubs, and any other hardware configured to function as a processor, a processing unit, or a processing device. Computing system 200 may use processing circuitry 220 to perform operations in accordance with one or more aspects of the present disclosure using software, hardware, firmware, or a mixture of hardware, software, and firmware residing in and/or executing at computing system 200. Any one or more of applications 288, policy manager 158, O1 services manager 160, O2 services manager 162, service manager 163, and data manager 155 may be hosted by a cloud provider or other third-party.

One or more communication units 219 of computing system 200 may communicate with devices external to computing system 200 by transmitting and/or receiving data, and may operate, in some respects, as both an input device and an output device. In some examples, communication units 219 may communicate with other devices over a network. In other examples, communication units 219 may send and/or receive radio signals on a radio network such as a cellular radio network. In other examples, communication units 219 of computing system 200 may transmit and/or receive satellite signals on a satellite network such as a Global Positioning System (GPS) network. Examples of communication units 219 include a network interface card (e.g., an Ethernet card), an optical transceiver, a radio frequency transceiver, a GPS receiver, or any other type of device that can send and/or receive information. Other examples of communication units 219 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 222 may represent any input devices of computing system 200 not otherwise separately described herein. One or more input devices 222 may generate, receive, and/or process input from any type of device capable of detecting input from a human or machine. For example, one or more input devices 222 may generate, receive, and/or process input in the form of electrical, physical, audio, image, and/or visual input (e.g., peripheral device, keyboard, microphone, camera).

One or more output devices 223 may represent any output devices of computing system 200 not otherwise separately described herein. One or more output devices 223 may generate, receive, and/or process input from any type of device capable of detecting input from a human or machine. For example, one or more output devices 223 may generate, receive, and/or process output in the form of electrical and/or physical output (e.g., peripheral device, actuator). In some examples, output devices 223 provide UI 286 with which an administrator may interact with computing system 200. In some examples, UI 286 is an implementation of UI 181 of FIGS. 1A-IC.

One or more storage device(s) 221 within computing system 200 may store information for processing during operation of computing system 200. Storage device(s) 221 may store program instructions and/or data associated with one or more of the modules described in accordance with one or more aspects of this disclosure. Processing circuitry 220 and one or more storage device(s) 221 may provide an operating environment or platform for such modules, which may be implemented as software, but may in some examples include any combination of hardware, firmware, and software. Processing circuitry 220 may execute instructions and one or more storage device(s) 221 may store instructions and/or data of one or more modules. The combination of processing circuitry 220 and storage device(s) 221 may retrieve, store, and/or execute the instructions and/or data of one or more applications, modules, or software. Processing circuitry 220 and/or storage device(s) 221 may also be operably coupled to one or more other software and/or hardware components, including, but not limited to, one or more of the components of computing system 200 and/or one or more devices or systems illustrated as being connected to computing system 200.

In some examples, one or more storage device(s) 221 are temporary memories, meaning that a primary purpose of the one or more storage devices is not long-term storage. Storage device(s) 221 of computing system 200 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Storage device(s) 221, in some examples, also include one or more computer-readable storage media. Storage device(s) 221 may be configured to store larger amounts of information than volatile memory. Storage device(s) 221 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Applications 288 may include SMO 112 and rApps 123A. SMO 112 provides orchestration, control management, and automation aspects of RAN 109 (e.g., network slicing, management, and orchestration of O-Cloud, etc.). Further, SMO 112 may control aspects of non-RT RIC 122 of FIGS. 1A-IC and near-RT RIC 124 of FIGS. 1A-IC.

As described above, rApps 123 may manage non-real time events within non-RT RIC 122, such as applications that do not require response times of less than one second. rApps 123 may leverage the functionality exposed via a non-RT RIC framework of computing device 200. rApps 123 may be used to control and manage RAN elements and resources, such as a near-RT RIC, RAN nodes, and/or resources in the O-RAN cloud. rApps 123 may provide one or more services that are performed using interfaces of computing system 200 (e.g., A1 interface, O1 interface, O2 interface, etc.). Examples of rApps 123 may include, e.g., services such as policies 1 for a near-RT RIC, configuration instructions 234 for O-RAN managed elements, performance jobs 236 for O-RAN managed elements, services for managing the services and/or data 238, etc.

Computing system 200 may include one or more modules or units configured to perform one or more services or functions of applications 288, such as policy manager 158, O1 services manager 160, O2 services manager 162, service manager 163, and data manager 155, as described above.

For example, policy manager 158 is configured to control the deployment of policies (e.g., A1 services). For example, policy manager 158 may receive requests for A1 services from applications 123 (e.g., via R1 interface 154 of FIG. 1B), process the A1 services from applications 123, and perform the A1 services for a near-RT RIC using an A1 interface (e.g., A1 interface 164 of FIG. 1B). In some examples, the A1 interface may implement an A1AP application protocol based on the 3GPP framework.

O1 services manager 160 is configured to control the deployment of O1 services for monitoring the performance of O-RAN managed elements (e.g., near-RT RIC 124, O-CU 146, O-DU 148 of FIG. 1B). For example, O1 services manager 160 may receive requests for O1 services for monitoring the performance of the near-RT RIC from applications 123 (e.g., via R1 interface 154 of FIG. 1B), process the O1 services, and perform the O1 services for the O-RAN managed elements using an O1 interface (e.g., O1 interface 166 of FIG. 1B). In some examples, the O1 interface may implement REST/HTTPS APIs and/or NETCONF.

O1 services manager 160 is additionally, or alternatively, configured to control the deployment of O1 services for the configuration of near-RT RIC 124 and/or RAN nodes. For example, O1 services manager 160 may receive requests for O1 services for the configuration of O-RAN managed elements from applications 123 (e.g., via R1 interface 154 of FIG. 1B), process the O1 services, and may perform the O1 services for the O-RAN managed elements using an O1 interface (e.g., O1 interface 166 of FIG. 1B).

O2 services manager 162 may be configured to control the deployment of O2 services for monitoring the performance of resources of the O-RAN cloud. For example, O2 services manager 162 may receive requests for O2 services for monitoring the performance of resources within the O-RAN cloud (e.g., via R1 interface 154 of FIG. 1B), process the O2 services, and may perform the O2 services for the resources of the O-RAN cloud using an O2 interface (e.g., O2 interface 167 of FIG. 1B).

O2 services manager 162 may additionally, or alternatively, be configured to control the deployment of O2 services for the configuration of resources of the O-RAN cloud. For example, O2 services manager 162 may receive requests for O2 services for configuring resources within the O-RAN cloud from applications 123 (e.g., via R1 interface 154 of FIG. 1B), process the O2 services, and may perform the O2 services for the resources of the O-RAN cloud using an O2 interface (e.g., O2 interface 167 of FIG. 1B).

Service manager 163 is configured to manage services, such as registration of a service, update of a service registration, service discovery, etc. For example, service manager 163 may receive requests for SME services from applications 123 (e.g., via R1 interface 154 of FIG. 1B), perform the SME service (e.g., register/update a service) for one or more applications 123, and send a response to the one or more applications 123 using an RI interface (e.g., R1 interface 154 of FIG. 1B).

Data manager 155 is configured to manage the data of applications 123. For example, data manager 155 may receive requests for DME services from applications 123 (e.g., via R1 interface 154 of FIG. 1B), perform the DME services (e.g., sending data from application configured as a data producer to application configured as a data consumer) for one or more applications 123, and send a response to the one or more applications 123 using an R1 interface (e.g., R1 interface 154 of FIG. 1B).

In accordance with the techniques of the disclosure, PMN orchestrator 180 enables the extension of network slices provisioned within private mobile network 120A of FIG. 1A across public mobile network 120B of FIG. 1A. For example, PMN orchestrator 180 provisions a public network slice within public mobile network 120B, which serve as a "virtual" private network slice extending the capabilities of resources of a corresponding private network slice provisioned within private mobile network 120A. PMN orchestrator 180 further provides corresponding management and orchestration functions for private mobile network 120A and public mobile network 120B.

For example, PMN orchestrator 180 receives, from an administrator via UI 181, information specifying one or more network functions for a private mobile network slice to be provisioned within private mobile network 120A. In some examples, PMN orchestrator 180 receives, via UI 181, one or more identifiers that indicate the one or more network functions for the private mobile network slice and one or more Internet Protocol (IP) addresses of each of the one or more network functions for the private mobile network slice. In some examples, the information specifying one or more network functions identify one or more core network functions of private mobile network 120A. In some examples, the information specifying one or more network functions identify one or more access network functions of private mobile network 120A, such as one or more RAN network functions.

In some examples, PMN orchestrator 180 further receives an identifier of the private mobile network slice. In some examples, PMN orchestrator 180 provisions the private mobile network slice within private mobile network 120A in accordance with the specified one or more network functions for the private mobile network slice. In some examples, PMN orchestrator 180 configures a CSMF or NSMF of private mobile network 120A to provision the private mobile network slice in accordance with the specified one or more network functions for the private mobile network slice.

Additionally, PMN orchestrator 180 generates and sends, to a controller for public mobile network 120B, a message indicating the one or more network functions for the private mobile network slice and configuration information for the private mobile network slice. The message is configured to enable the controller for public mobile network 120B to provision a public mobile network slice extending the private mobile network slice.

For example, PMN orchestrator 180 generates an extended GSMA GST 292 that comprises a GSMA GST that is extended, in accordance with the techniques of the disclosure, to include attributes for one or more network functions of a mobile network slice. The PMN orchestrator generates an extended GSMA NEST 294 by mapping the information specifying the one or more network functions for the private mobile network slice and configuration information for the private mobile network slice to the corresponding attributes of the extended GSMA GST 292. The extended GSMA NEST 294 comprises a GSMA NEST extended, in accordance with the techniques of the disclosure, to include values for the attributes of the extended GSMA GST 292, the values specifying the one or more network functions for the private mobile network slice and the configuration information for the private mobile network slice.

In some examples, the values specifying the one or more network functions for the private mobile network slice of the extended GSMA NEST include one or more identifiers, each identifier indicating one of the one or more network functions for the private mobile network slice. In some examples, the values specifying the one or more network functions for the private mobile network slice of the extended GSMA NEST further include an IP address of each of the one or more network functions for the private mobile network slice.

In some examples, the values specifying the one or more network functions for the private mobile network slice of the extended GSMA NEST identify one or more core network functions for the private mobile network slice. In some examples, the values specifying the one or more network functions for the private mobile network slice of the extended GSMA NEST identify one or more access network functions of private mobile network 120A, such as one or more RAN network functions, for the private mobile network slice.

In some examples, the configuration information for the private mobile network slice of the extended GSMA NEST comprises an indication of one or more resources required by the private mobile network slice. For example, such resources may include, e.g., a bandwidth required a private mobile network slice or required by one or more UPFs deployed by the private mobile network slice. In some examples, the configuration information for the private mobile network slice of the extended GSMA NEST comprises an SLA requirement for the private mobile network slice.

PMN orchestrator 180 sends, to a management function of public mobile network 120B of FIG. 1A, the extended GSMA GST 292 indicating the one or more network functions for the private mobile network slice and configuration information for the private mobile network slice. The management function of public mobile network 120B may use the extended GSMA NEST to provision the public mobile network slice extending the private mobile network slice. The public mobile network slice provisioned within public mobile network 120B operates as a "virtual" private mobile network slice that extends the resources and capabilities of the private mobile network slice provisioned within private mobile network 120A.

In some examples, PMN orchestrator 180 generates and stores a mapping between the private mobile network slice and the public mobile network slice. For example, after the management function of public mobile network 120B provisions the public mobile network slice extending the private mobile network slice of public mobile network 120A, public mobile network 120B sends, to PMN orchestrator 180, an identifier of the public mobile network slice. PMN orchestrator 180 generates a mapping or an association between an identifier of the private mobile network slice and the identifier of the public mobile network slice. PMN orchestrator 180 stores the mapping or association between the identifier of the private mobile network slice and the identifier of the public mobile network slice in, e.g., storage devices 221. Example identifiers (or "slice identifiers") of a private mobile network slice or public mobile network slice may include any one or more of the following: Network Slice Instance (NSI), Network Slice Subnet Instance (NSSI), Transport Network Slice Instance (TN-NSSI), Single Network Slice Selection Assistance Information (S-NSSAI), Transport Network Slice Interworking Identifier (TNSII), or Transport Network Slice Identifier (TNSI). Identifiers of a private mobile network slice or public mobile network slice may be a combination of an identifier for the public or private mobile network and a slide identifier.

In some examples, PMN orchestrator 180 uses the slice mapping information between the private mobile network slice and the public mobile network slice described above to perform monitoring of performance metrics (PMs) of the private mobile network slice and the public mobile network slice. For example, PMN orchestrator 180 obtains one or more first metrics for the private mobile network slice from the management function of private mobile network 120A. PMN orchestrator 180 further one or more second metrics for the public mobile network slice from the management function of public mobile network 120B. PMN orchestrator 180 generates, based at least in part on the one or more first metrics and the one or more second metrics, one or more KPIs representative of an aggregate performance of the private mobile network slice and the public mobile network slice. In some examples, the aggregate performance of the private mobile network slice and the public mobile network slice may be proportionally weighted according to usage, bandwidth, or other metrics of the private mobile network slice with respect to the public mobile network slice.

PMN orchestrator 180 compares the one or more KPIs representative of the aggregate performance of the private mobile network slice and the public mobile network slice to one or more pre-determined thresholds. In some examples, the one or more pre-determined thresholds are one or more performance requirements specified by one or more SLAs for the private mobile network slice, the public mobile network slice, a UPF provided by the private mobile network slice, and/or one or more network functions offered by the private mobile network or the public mobile network. In response to determining that the one or more KPIs representative of the aggregate performance of the private mobile network slice and the public mobile network slice do not satisfy the one or more pre-determined thresholds, PMN orchestrator 180 performs one or more remedial actions. Such remedial actions may include, e.g., outputting an alert or alarm to an administrator. In some examples, PMN orchestrator 180 may receive an alarm for the private mobile network slice or the public mobile network slice and generate an alarm for both the private mobile network slice or the public mobile network slice using the slice mapping information between the private mobile network slice and the public mobile network slice described herein.

Such remedial actions may further include, e.g., adjusting an allocation of resources to at least one of the private mobile network slice and the public mobile network slice. In some examples, PMN orchestrator 180 adjusts the allocation of resources by increasing or decreasing the resources allocated within at least one of the private mobile network slice and the public mobile network slice. In some examples, PMN orchestrator 180 adjusts the allocation of resources by adjusting the proportion of network traffic allocated to each of the private mobile network slice and the public mobile network slice (e.g., adjusting the load-balancing of network traffic across the private mobile network slice and the public mobile network slice).

In the example of FIG. 2, PMN orchestrator 180 is described as implemented by SMO 112 of computing device 200. However, in addition or alternatively, the techniques disclosed herein may also be implemented by an rApp of a non-RT RIC or an xApp of a near-RT RIC, such as non-RT RIC 122 and near-RT RIC 124 of FIGS. 1A-1C. For example, all or a portion of the functionality of PMN orchestrator 180 may be executed by non-RT RIC 122 and/or near-RT RIC 124 of FIGS. 1A-IC.

Figure 3:
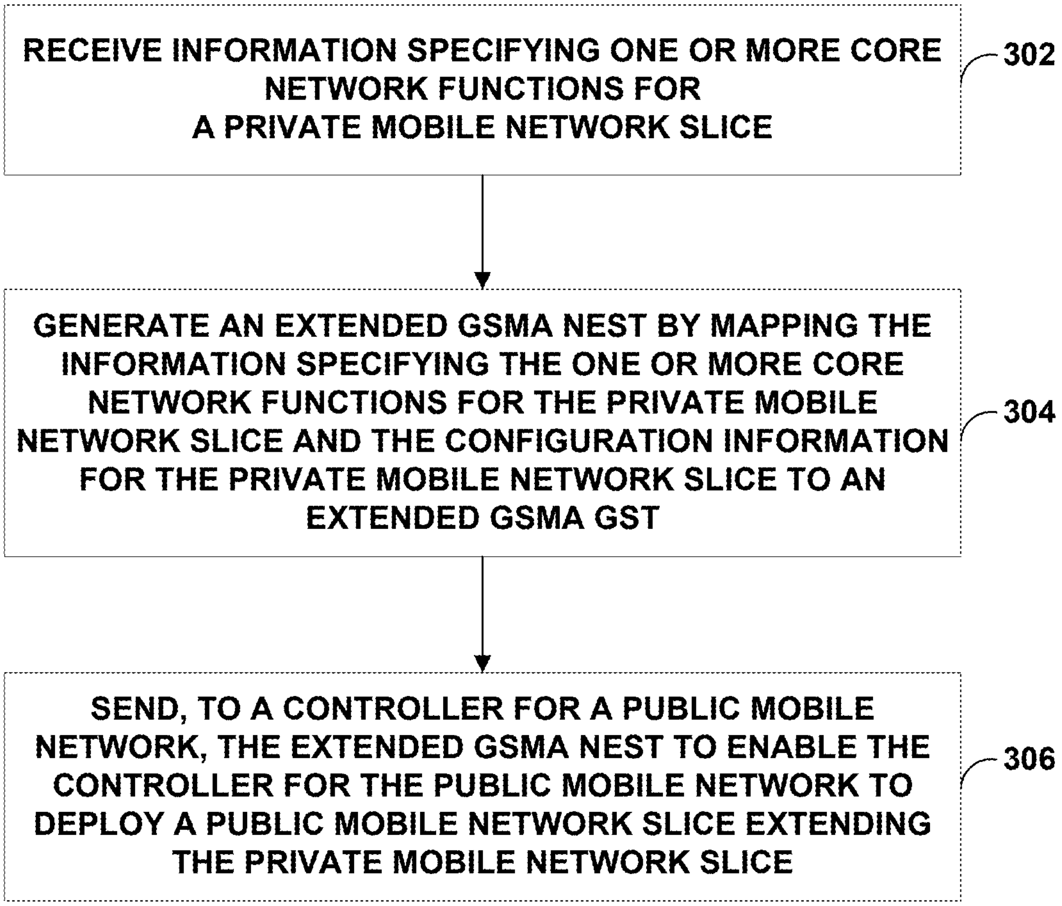
FIG. 3 is a flowchart illustrating an example operation in accordance with the techniques of this disclosure.

FIG. 3 is a flowchart illustrating an example operation in accordance with the techniques of this disclosure. FIG. 3 is described with respect to the PMN orchestrator 180 of computing system 200 of FIG. 2 for convenience. However, the operation of FIG. 3 may also be performed by PMN orchestrator 180 of FIGS. 1A-1C.

As depicted in the example operation of FIG. 3, PMN orchestrator 180 enables extension of private mobile network 120A across public mobile network 120B, as well as providing corresponding management and orchestration functions for private mobile network 120A and public mobile network 120B.

For example, PMN orchestrator 180 receives, from an administrator via UI 181, information specifying one or more network functions for a private mobile network slice to be provisioned within private mobile network 120A (302). In some examples, PMN orchestrator 180 receives, via UI 181, one or more identifiers that indicate the one or more network functions for the private mobile network slice and one or more IP addresses of each of the one or more network functions for the private mobile network slice. In some examples, PMN orchestrator 180 further receives an identifier of the private mobile network slice. In some examples, PMN orchestrator 180 provisions the private mobile network slice within private mobile network 120A in accordance with the specified one or more network functions for the private mobile network slice. In some examples, PMN orchestrator 180 configures a CSMF or NSMF of private mobile network 120A to provision the private mobile network slice in accordance with the specified one or more network functions for the private mobile network slice.

PMN orchestrator 180 generates an extended GSMA GST 292 that comprises a GSMA GST that is extended, in accordance with the techniques of the disclosure, to include attributes for one or more network functions of a mobile network slice. The PMN orchestrator generates an extended GSMA NEST 294 by mapping the information specifying the one or more network functions for the private mobile network slice and configuration information for the private mobile network slice to the attributes of the extended GSMA GST 292 (304). The extended GSMA NEST 294 comprises a GSMA NEST extended, in accordance with the techniques of the disclosure, to include values for the attributes of the extended GSMA GST 292, the values specifying the one or more network functions for the private mobile network slice and the configuration information for the private mobile network slice.

In some examples, the values specifying the one or more network functions for the private mobile network slice of the extended GSMA NEST include one or more identifiers, each identifier indicating one of the one or more network functions for the private mobile network slice. In some examples, an identifier indicating one of the one or more network functions comprises an integer, a hexadecimal value, a numerical value, a text string, or another piece of information that identifies or distinguishes a type of a network function from other types of network functions. In some examples, the values specifying the one or more network functions for the private mobile network slice of the extended GSMA NEST further include an Internet Protocol (IP) address of each of the one or more network functions for the private mobile network slice.

In some examples, the configuration information for the private mobile network slice of the extended GSMA NEST comprises an indication of one or more resources required by the private mobile network slice. For example, such resources may include a bandwidth required by a UPF of the private mobile network slice. In some examples, the configuration information for the private mobile network slice of the extended GSMA NEST comprises an SLA requirement for the private mobile network slice.

PMN orchestrator 180 sends, to a management function of public mobile network 120B of FIG. 1A, the extended GSMA GST 292 indicating the one or more network functions for the private mobile network slice and configuration information for the private mobile network slice (306). The management function of public mobile network 120B may use the extended GSMA NEST to provision the public mobile network slice extending the private mobile network slice. The public mobile network slice provisioned within public mobile network 120B operates as a "virtual" private mobile network slice that extends the resources and capabilities of the private mobile network slice provisioned within private mobile network 120A.

Figure 4:
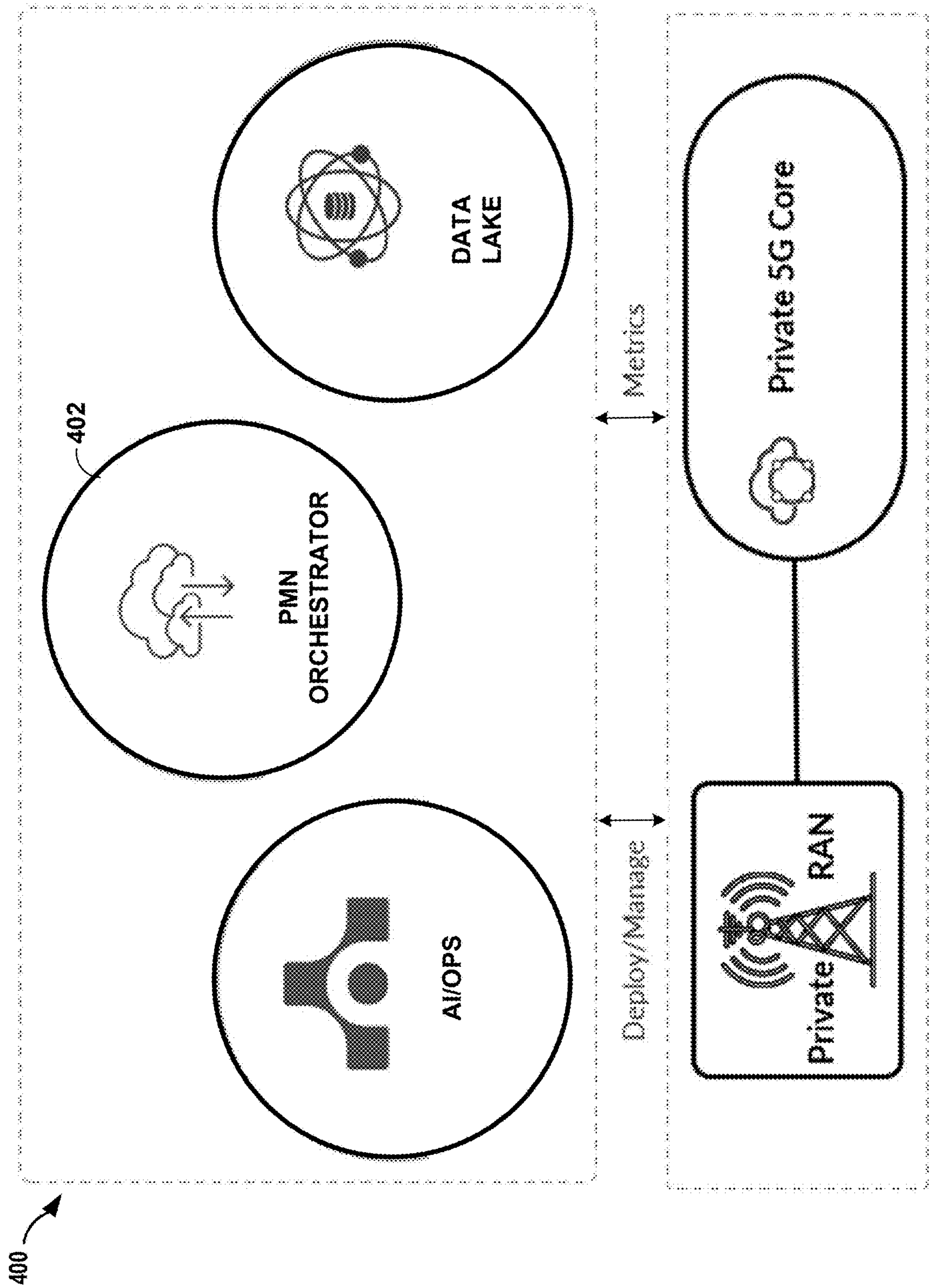
FIG. 4 is a block diagram illustrating an example network system configured to enable extension of a private mobile network across a public mobile network, in accordance with one or more techniques of the disclosure.

FIG. 4 is a block diagram illustrating example network system 400 configured to enable extension of a private mobile network across a public mobile network, in accordance with one or more techniques of the disclosure. In some examples, network system 400 may be implemented by network system 100 of FIGS. 1A-IC. As depicted in the example of FIG. 4, PMN orchestrator 402 manages network creation, network configuration, monitoring and user management. PMN orchestrator 402 collects and stores telemetry data such as logs, performance measurements (PMs), Key Performance Indicators (KPIs), and alarms. An SMO, such as SMO 112 of FIG. 1A, may include an operation support system that analysis the real-time and stored telemetry data and create insights into the issues or may take automated corrective actions.

Figure 5:
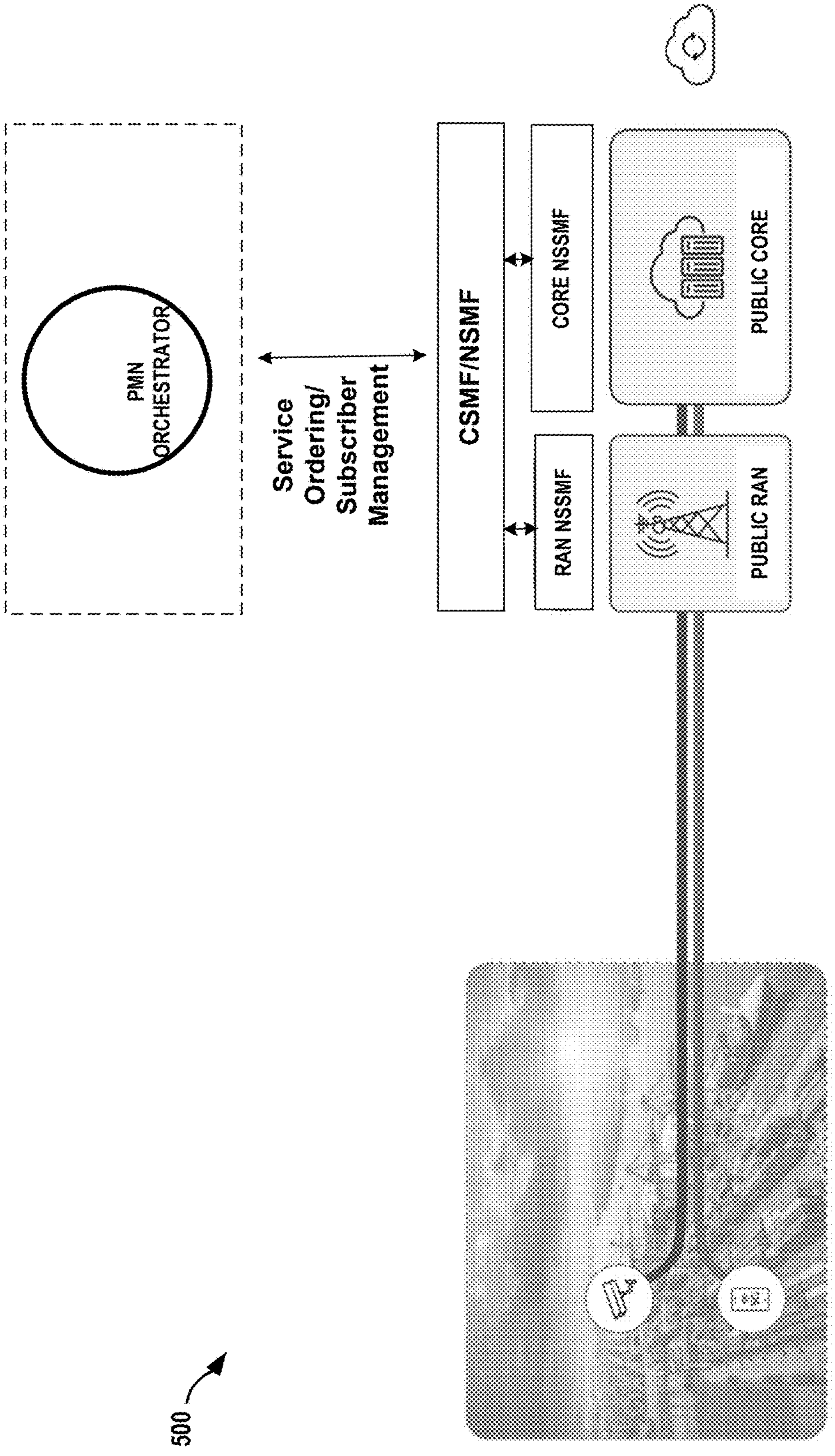
FIG. 5 is a block diagram illustrating an example network system configured to enable extension of a private mobile network across a public mobile network, in accordance with one or more techniques of the disclosure.

FIG. 5 is a block diagram illustrating example network system 500 configured to enable extension of a private mobile network across a public mobile network, in accordance with one or more techniques of the disclosure. In some examples, network system 400 may be implemented by network system 100 of FIGS. 1A-IC. With the network slicing features described herein, a virtual private network can be provided by a public mobile network with network slices. For example, a PMN orchestrator may create private, dedicated network slices per enterprise customer on a public mobile network. This allows the creation of virtual private mobile networks utilizing existing public mobile networks without deploying additional private network infrastructure. The Service Orchestrator of the public mobile network manages dynamic and isolated network slices covering RAN, Transport, and Core network. The granularity of the virtual private coverage is usually a Tracking Area.

Figure 6:
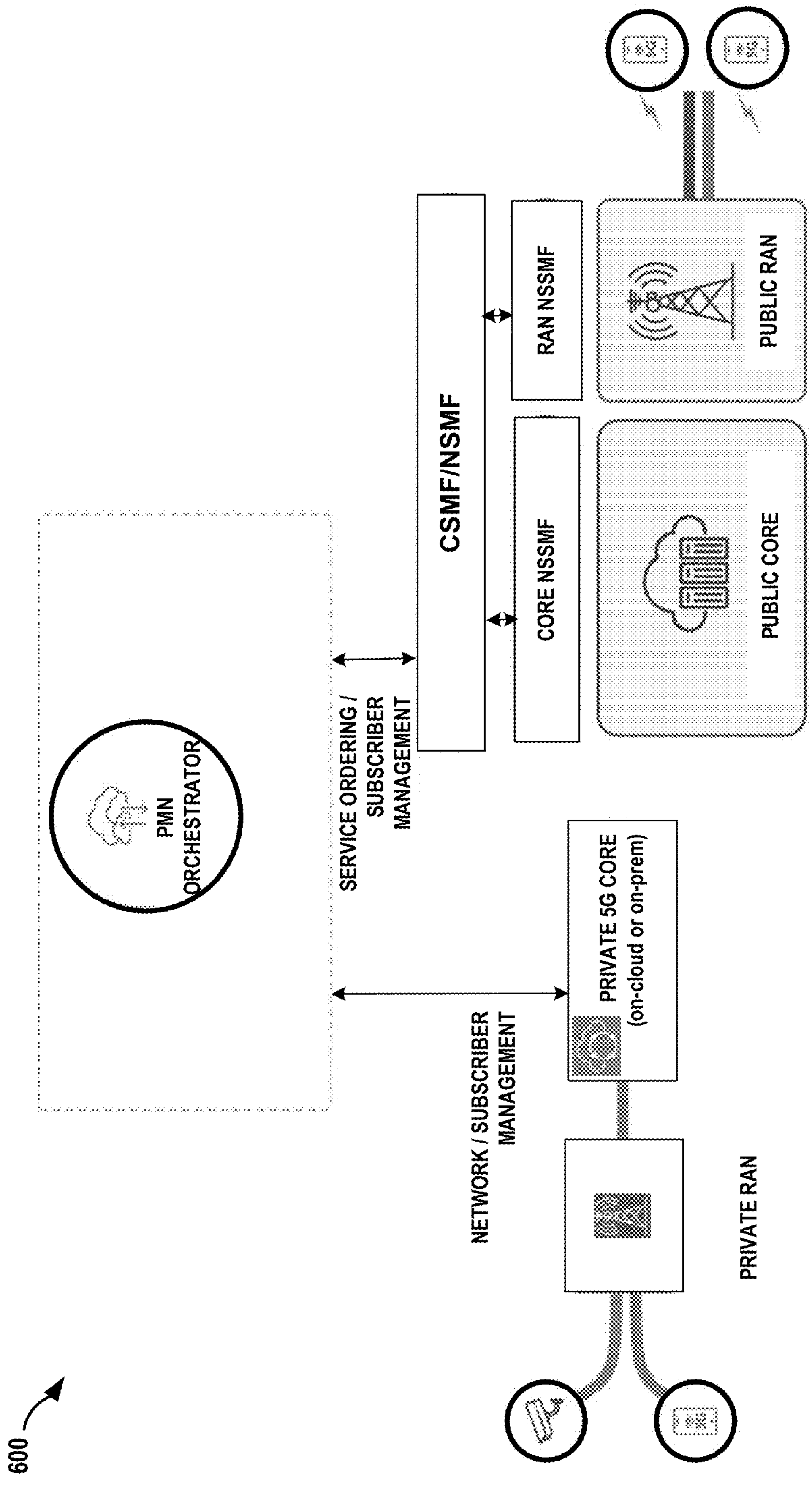
FIG. 6 is a block diagram illustrating an example network system configured to enable extension of a private mobile network across a public mobile network, in accordance with one or more techniques of the disclosure.

FIG. 6 is a block diagram illustrating example network system 600 configured to enable extension of a private mobile network across a public mobile network, in accordance with one or more techniques of the disclosure. In some examples, network system 400 may be implemented by network system 100 of FIGS. 1A-IC. As depicted in the example of FIG. 6, a private mobile network manager, such as PMN orchestrator 180 of FIG. 1A, provides joint orchestration of private and public mobile networks. For example, PMN orchestrator 180 provisions and configures a standalone, physical private mobile network at an organization's premises as well as initiates the creation of dedicated network slices on public mobile networks that serve an organization's users by providing virtual network coverage outside of an organization's premises.

The PMN orchestrator described herein allows a single pane of glass for network configuration, and subscriber data. For example, the network configuration data such as tracking areas for the virtual portion of the private mobile network, and locations of the physical private radios, can be stored and viewed on the same platform. In addition, the PMN orchestrator may enable a user to perform private subscriber management through the same platform. For example, if separate Subscriber Identity Modules (alternatively, "Subscriber Identification Modules") (SIMs) are needed on the physical private mobile network and on the public virtual mobile private network, the PMN orchestrator may enable a user to order and manage both SIMs through the same network management platform.

Figure 7:
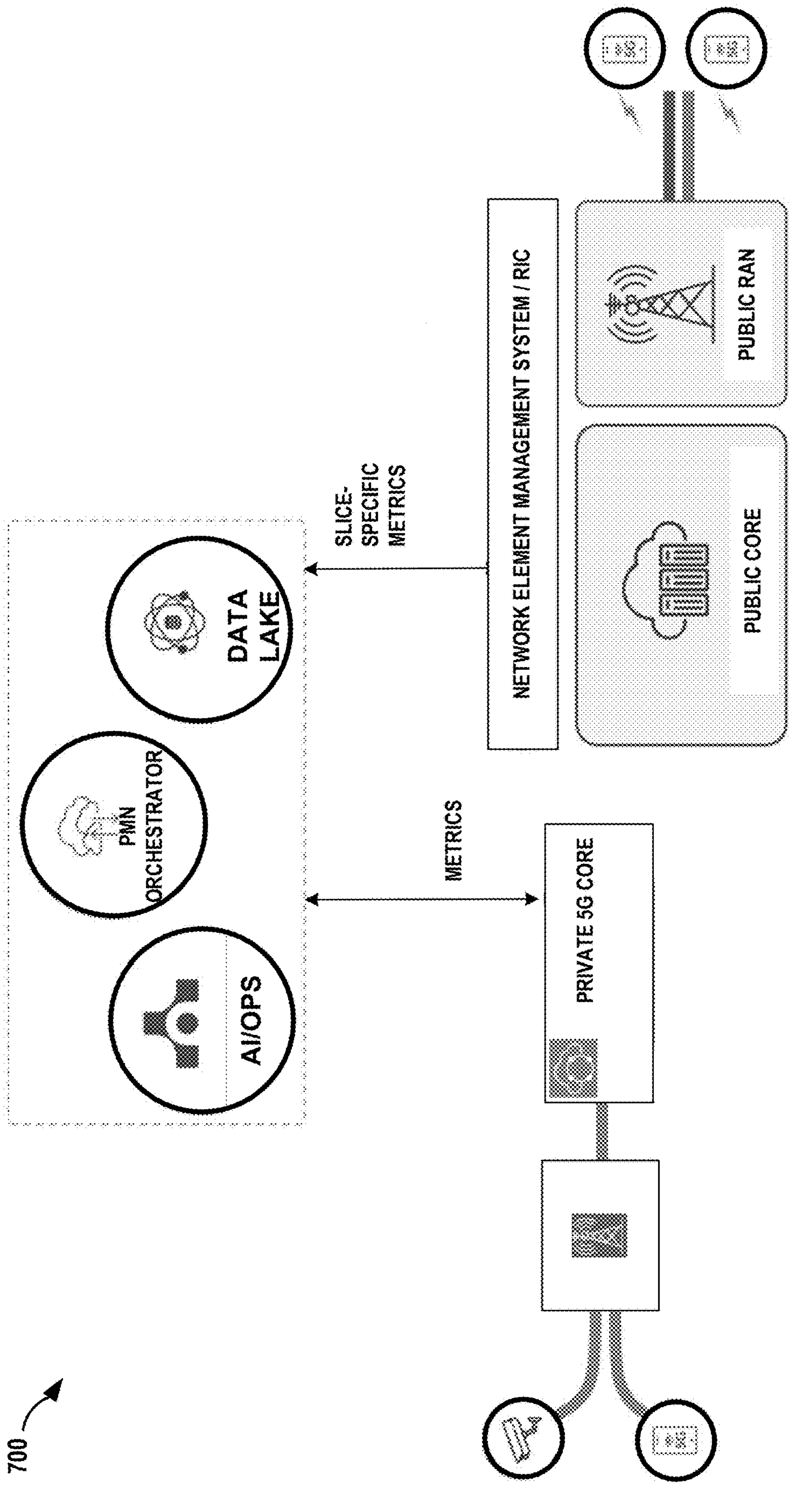
FIG. 7 is a block diagram illustrating an example network system configured to enable extension of a private mobile network across a public mobile network, in accordance with one or more techniques of the disclosure.

FIG. 7 is a block diagram illustrating example network system 700 configured to enable extension of a private mobile network across a public mobile network, in accordance with one or more techniques of the disclosure. In some examples, network system 400 may be implemented by network system 100 of FIGS. 1A-IC. As depicted in the example of FIG. 7, a private mobile network manager, such as PMN orchestrator 180 of FIG. 1, collects telemetry data from the private mobile network and the network slice-specific data from a corresponding virtual private mobile network provisioned on the corresponding public mobile network. An operation support system, such as that provided by SMO 112 of FIG. 1A, processes data from both sources and provides insights into optimization of quality of experience.

In some examples, the PMN orchestrator orchestrates and deploys private mobile network RAN network functions, Core network functions, and the transport connectivity between them. Further, the PMN orchestrator initiates the creation of network slice(s) on the public mobile network as a northbound consumer of a CSMF of the public mobile network.

In the case of dedicated RAN network functions for a private mobile network, the PMN orchestrator initiates a slice mapping configuration between the private mobile network slice and the public mobile network slice.

In the case of shared RAN network functions between the private mobile network and the public mobile network, the PMN orchestrator may request not only the creation of a public mobile network slice, but additionally may provide information describing network functions (AMF, UPF, etc.) of the public mobile network slice to the CSMF or NSMF of the public mobile network so as to enable the CSMF or NSMF of the public mobile network to create and configure the public mobile network slice. As described above, the techniques of the disclosure extend the GSMA GST NG.116 specification to support the specification of such new and novel information.

In some examples, the techniques of the disclosure enable joint monitoring of private and public mobile networks. For example, the PMN orchestrator collects telemetry data from the private mobile network and slice-specific data from the corresponding virtual private mobile network instantiated on the public mobile network. As a result, an intelligent operation support system of the PMN orchestrator may process telemetry data from both sources so as to provide insights into the optimization of quality of experience or take corrective actions.

For example, the PMN orchestrator monitors PMs from both the public RAN network slice and the private mobile network slice, and uses the slice mapping information to generate combined or aggregated PMs. The PMN orchestrator further generates KPIs from the aggregated PMs so as to achieve combined or aggregated KPIs representative of both the public RAN network slice and the private mobile network slice. The PMN orchestrator monitors alarms from both the public RAN slice and the private mobile network slice. The PMN orchestrator may use the slice mapping information to generate combined or aggregated alarms representative of both the public RAN network slice and the private mobile network slice based at least in part on the monitored alarms.

Figure 8:
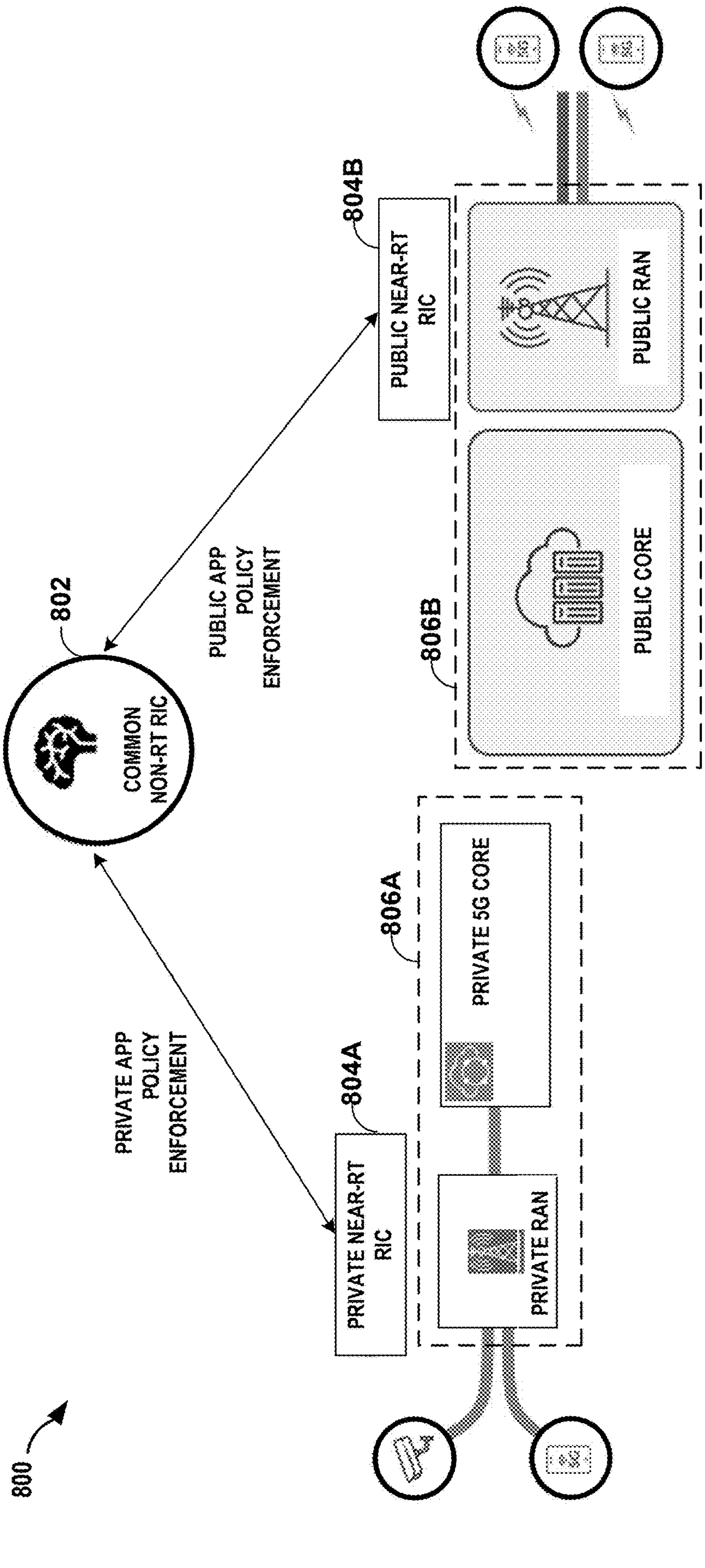
FIG. 8 is a block diagram illustrating an example network system configured to enable extension of a private mobile network across a public mobile network, in accordance with one or more techniques of the disclosure.

FIG. 8 is a block diagram illustrating example network system 800 configured to enable extension of private mobile network 806A across public mobile network 806B, in accordance with one or more techniques of the disclosure. In some examples, network system 800 may be implemented by network system 100 of FIGS. 1A-IC. As depicted in the example of FIG. 8, network system 800 implements a common RIC for both a private mobile network and a public mobile network. For example, network system 800, as described herein, envisions a common Non-RT RIC 802 and common rApps that control both private Near-RT RIC 804A and public Near-RT RIC 804B (and corresponding xApps). This feature may allow differentiated, but coordinated, policy enforcement on the xApps on private and public mobile networks. For example, the use of common Non-RT RIC 802 and common rApps may allow a common rApp to enforce differentiated admission control policy for enterprise users, depending on whether the users are operating within a private mobile network slice or within a virtual private slice provided by a public mobile network. Similarly, a single rApp running on the common NonRT RIC 802 may control differentiated, but coordinated, slice SLA enforcement for enterprise users.

As described herein, network system 800 implements a shared RIC that provides common management of both private mobile network 806A and public mobile network 806B. In the foregoing example, the shared RIC is a non-RT RIC 802 that provides common management of non-RT functions for both private mobile network 806A and public mobile network 806B, while each mobile network 806A, 806B maintains the use of an independent near-RT RIC. For example, private Near-RT RIC 804A provides near-RT functions for private mobile network 806A, and public Near-RT RIC 804B provides near-RT functions for public mobile network 806B. However, in other examples, network system 800 implements both a shared non-RT RIC as well as a shared near-RT RIC that provide common management of both non-RT functions and near-RT functions, respectively, for both private mobile network 806A and public mobile network 806B.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A computing system comprising:
processing circuitry; and
storage media comprising instructions executable by the processing circuitry to cause the computing system to execute a Private Mobile Network (PMN) orchestrator, wherein the PMN orchestrator is configured to:
generate an extended Global System for Mobile communications Association (GSMA) NEtwork Slice Type (NEST) by mapping one or more core network functions and one or more Radio Access Network (RAN) functions for the private mobile network slice and configuration information for the private mobile network slice to an extended GSMA Generic Network Slice Template (GST),
wherein the extended GSMA GST comprises a GSMA GST extended to include attributes for one or more network functions of a mobile network slice, and
wherein the extended GSMA NEST comprises a GSMA NEST extended to include values for the attributes of the extended GSMA GST, the values specifying the one or more core network functions and the one or more RAN functions for the private mobile network slice and the configuration information for the private mobile network slice; and
send, to one of a Communication Service Management Function (CSMF) or a Network Services Management Function (NSMF) for a public mobile network, the extended GSMA NEST to enable the one of the CSMF or the NSME for the public mobile network to provision a public mobile network slice extending the private mobile network slice using the one or more core network functions and the one or more RAN functions for the private mobile network slice.

2. The computing system of claim 1, wherein the PMN orchestrator is further configured to:
generate a mapping between the private mobile network slice and the public mobile network slice; and
store the mapping.

3. The computing system of claim 2, wherein the mapping comprises an association between a first identifier of the private mobile network slice and a second identifier of the public mobile network slice.

4. The computing system of claim 1, wherein the attributes for the one or more network functions of the mobile network slice comprise information indicating:
an identifier of each of the one or more network functions for the private mobile network slice; and
an Internet Protocol (IP) address of each of the one or more network functions for the private mobile network slice.

5. The computing system of claim 1, wherein the configuration information indicates one or more of:
a bandwidth required by the private mobile network slice; or
a Service Level Agreement (SLA) requirement for the private mobile network slice.

6. The computing system of claim 1,
wherein the PMN orchestrator is configured to receive, via a user interface, information specifying the one or more network functions for the private mobile network slice, and
wherein the controller for the public mobile network comprises at least one of a Communication Service Management Function (CSMF) or a Network Services Management Function (NSMF) of the public mobile network.

7. The computing system of claim 1,
wherein the public mobile network and the private mobile network comprise one or more Fifth-Generation (5G) radio access networks (RANs) implemented using an Open Radio Access Network (O-RAN) infrastructure and one or more 5G core networks, and
wherein the processing circuitry is configured to execute a service management and orchestration (SMO) framework for managing the O-RAN infrastructure, the SMO framework comprising the PMN orchestrator.

8. The computing system of claim 1, wherein the processing circuitry is further configured to:
obtain, from a controller for the private mobile network, one or more first metrics for the private mobile network slice;
obtain, from the controller for public mobile network, one or more second metrics for the public mobile network slice; and
generate, based at least in part on the one or more first metrics and the one or more second metrics, one or more Key Performance Indicators (KPIs) representative of an aggregate performance of the private mobile network slice and the public mobile network slice.

9. The computing system of claim 8, wherein the processing circuitry is further configured to:
compare the one or more KPIs representative of the aggregate performance of the private mobile network slice and the public mobile network slice to one or more pre-determined thresholds; and
output an alarm based on the comparison.

10. The computing system of claim 1, wherein the processing circuitry is further configured to adjust, based on one or more first Key Performance Indicators (KPIs) representative of a performance of the private mobile network slice and one or more second KPIs representative of a performance of the public mobile network slice, an allocation of resources to at least one of the private mobile network slice and the public mobile network slice.

11. The computing system of claim 1, wherein the processing circuitry is further configured to execute a Radio Access Network (RAN) Intelligent Controller (RIC) configured to provide common management of both the private mobile network and the public mobile network.

12. A method comprising:
generating, by a Private Mobile Network (PMN) orchestrator executed by processing circuitry, an extended Global System for Mobile communications Association (GSMA) NEtwork Slice Type (NEST) by mapping one or more core network functions and one or more Radio Access Network (RAN) functions for the private mobile network slice and configuration information for the private mobile network slice to an extended GSMA Generic Network Slice Template (GST).
wherein the extended GSMA GST comprises a GSMA GST extended to include attributes for one or more network functions of a mobile network slice, and
wherein the extended GSMA NEST comprises a GSMA NEST extended to include values for the attributes of the extended GSMA GST, the values specifying the one or more core network functions and the one or more RAN functions for the private mobile network slice and the configuration information for the private mobile network slice; and
sending, by the PMN orchestrator and to one of a Communication Service Management Function (CSMF) or a Network Services Management Function (NSMF) for a public mobile network, the extended GSMA NEST to enable the one of the CSMF or the NSME for the public mobile network to provision a public mobile network slice extending the private mobile network slice using the one or more core network functions and the one or more RAN functions for the private mobile network slice.

13. The method of claim 12, further comprising:
generating, by the PMN orchestrator, a mapping between the private mobile network slice and the public mobile network slice; and
storing, by the PMN orchestrator, the mapping.

14. The method of claim 12, wherein the attributes for the one or more network functions of the mobile network slice comprise information indicating:
an identifier of each of the one or more network functions for the private mobile network slice; and
an Internet Protocol (IP) address of each of the one or more network functions for the private mobile network slice.

15. The method of claim 12,
wherein the method further comprises receiving, by the PMN orchestrator, via a user interface, information specifying the one or more network functions for the private mobile network slice, and
wherein the controller for the public mobile network comprises at least one of a Communication Service Management Function (CSMF) or a Network Services Management Function (NSMF) of the public mobile network.

16. The method of claim 12,
wherein the public mobile network and the private mobile network comprise one or more Fifth-Generation (5G) radio access networks (RANs) implemented using an Open Radio Access Network (O-RAN) infrastructure and one or more 5G core networks, and
wherein the method further comprises executing, by the processing circuitry, a service management and orchestration (SMO) framework for managing the O-RAN infrastructure, the SMO framework comprising the PMN orchestrator.

17. The method of claim 12, further comprising:
obtaining, by the PMN orchestrator and from a controller for the private mobile network, one or more first metrics for the private mobile network slice;
obtaining, by the PMN orchestrator and from the controller for public mobile network, one or more second metrics for the public mobile network slice; and
generating, by the PMN orchestrator and based at least in part on the one or more first metrics and the one or more second metrics, one or more Key Performance Indicators (KPIs) representative of an aggregate performance of the private mobile network slice and the public mobile network slice.

18. Non-transitory, computer-readable media comprising instructions that, when executed, are configured to cause processing circuitry to:
execute a Private Mobile Network (PMN) orchestrator configured to:
generate an extended Global System for Mobile communications Association (GSMA) NEtwork Slice Type (NEST) by mapping one or more core network functions and one or more Radio Access Network (RAN) functions for the private mobile network slice and configuration information for the private mobile network slice to an extended GSMA Generic Network Slice Template (GST),
wherein the extended GSMA GST comprises a GSMA GST extended to include attributes for one or more network functions of a mobile network slice, and
wherein the extended GSMA NEST comprises a GSMA NEST extended to include values for the attributes of the extended GSMA GST, the values specifying the one or more core network functions and the one or more RAN functions for the private mobile network slice and the configuration information for the private mobile network slice; and
send, to one of a Communication Service Management Function (CSMF) or a Network Services Management Function (NSMF) for a public mobile network, the extended GSMA NEST one of the CSMF or the NSME for the public mobile network to provision a public mobile network slice extending the private mobile network slice using the one or more core network functions and the one or more RAN functions for the private mobile network slice.

* * * * *